(12) United States Patent
Forney et al.

(10) Patent No.: US 8,559,605 B2
(45) Date of Patent: Oct. 15, 2013

(54) EXTENSIBLE DIAGNOSTIC TOOL

(75) Inventors: David Forney, Santa Clara, CA (US); Heine Frifeldt, Mountain View, CA (US); Anthony Shaffer, Santa Cruz, CA (US)

(73) Assignee: Avaya Inc., Basking Ridge, NJ (US)

(*) Notice: Subject to any disclaimer, the term of this patent is extended or adjusted under 35 U.S.C. 154(b) by 1896 days.

(21) Appl. No.: 11/053,270

(22) Filed: Feb. 7, 2005

(65) Prior Publication Data

US 2006/0177008 A1 Aug. 10, 2006

(51) Int. Cl.
*H04M 1/64* (2006.01)
*G06F 9/44* (2006.01)

(52) U.S. Cl.
USPC ............................ 379/88.22; 717/100

(58) Field of Classification Search
USPC ............... 379/88.11, 88.22; 717/100
See application file for complete search history.

(56) References Cited

U.S. PATENT DOCUMENTS

| | | | |
|---|---|---|---|
| 1,113,631 A | | 10/1914 | Hofmann et al. |
| 5,029,199 A | | 7/1991 | Jones et al. |
| 5,345,501 A | | 9/1994 | Shelton |
| 5,568,540 A | | 10/1996 | Greco et al. |
| 5,572,578 A | | 11/1996 | Lin et al. |
| 5,634,098 A | * | 5/1997 | Janniro et al. ............... 714/38.1 |
| 5,647,002 A | | 7/1997 | Brunson |
| 5,703,942 A | | 12/1997 | Pinard et al. |
| 5,712,901 A | | 1/1998 | Meermans |
| 5,742,668 A | | 4/1998 | Pepe et al. |
| 5,778,212 A | * | 7/1998 | Dehnert et al. ............... 717/155 |
| 5,778,390 A | | 7/1998 | Nelson et al. |
| 5,845,203 A | | 12/1998 | LaDue |
| 5,903,627 A | | 5/1999 | Shaffer et al. |
| 5,909,483 A | | 6/1999 | Weare et al. |
| 5,915,001 A | | 6/1999 | Uppaluru |
| 5,946,386 A | | 8/1999 | Rogers et al. |
| 5,960,202 A | * | 9/1999 | Granston et al. ............... 717/141 |

(Continued)

FOREIGN PATENT DOCUMENTS

| | | |
|---|---|---|
| DE | 10338237 | 3/2005 |
| WO | WO 2006/086335 A1 | 8/2006 |
| WO | WO 2006/086335 A2 | 8/2006 |
| WO | WO 2006/086335 A3 | 8/2006 |

OTHER PUBLICATIONS

"Introducing Adomo MCS Voice Access to Microsoft Outlook/Exchange," Adomo, Inc., http://support.adomo.com/3.1/user/, for Sep. 2003 release.

(Continued)

*Primary Examiner* — Joseph T Phan
(74) *Attorney, Agent, or Firm* — Sheridan Ross P.C.

(57) ABSTRACT

An integrated messaging system for performing various types of messaging across different types of networks, including integrated user interfaces and administrator interfaces. Embodiments include a communication server that couples among networks of different types, and an interface module that couples to the communication server. The interface module may be hosted on a messaging server of a network. The interface module pulls various user information from the messaging server, including information relevant to at least the network that includes the messaging server. A cache couples to the communication server and to the interface module to hold information from the communication server and/or the user information pulled from messaging server. The interface module directs a message from the messaging server and/or the cache to at least one device on the networks using the user information.

31 Claims, 20 Drawing Sheets

(56) References Cited

U.S. PATENT DOCUMENTS

| | | |
|---|---|---|
| 5,995,596 A | 11/1999 | Shaffer et al. |
| 6,021,181 A | 2/2000 | Miner et al. |
| 6,047,053 A | 4/2000 | Miner et al. |
| 6,070,081 A | 5/2000 | Takahashi et al. |
| 6,072,862 A | 6/2000 | Srinivasan |
| 6,076,090 A | 6/2000 | Burroughs et al. |
| 6,085,231 A | 7/2000 | Agraharam et al. |
| 6,138,209 A | 10/2000 | Krolak et al. |
| 6,163,794 A | 12/2000 | Lange et al. |
| 6,212,265 B1 | 4/2001 | Duphorne |
| 6,233,318 B1 | 5/2001 | Picard et al. |
| 6,253,206 B1 | 6/2001 | Burton et al. |
| 6,275,570 B1 | 8/2001 | Homan et al. |
| 6,304,636 B1 | 10/2001 | Goldberg et al. |
| 6,317,484 B1 | 11/2001 | McAllister |
| 6,317,485 B1 | 11/2001 | Homan et al. |
| 6,324,265 B1 | 11/2001 | Christie, IV et al. |
| 6,339,776 B2 | 1/2002 | Dayani-Fard et al. |
| 6,351,523 B1 | 2/2002 | Detlef |
| 6,389,115 B1 | 5/2002 | Swistock |
| 6,389,276 B1 | 5/2002 | Brilla et al. |
| 6,396,907 B1 | 5/2002 | Didcock |
| 6,396,908 B1 | 5/2002 | O'Donovan et al. |
| 6,405,035 B1 | 6/2002 | Singh |
| 6,411,685 B1 | 6/2002 | O'Neal |
| 6,434,222 B1 | 8/2002 | Shaffer et al. |
| 6,438,215 B1 | 8/2002 | Skladman et al. |
| 6,493,431 B1 | 12/2002 | Troen-Krasnow et al. |
| 6,501,750 B1 | 12/2002 | Shaffer et al. |
| 6,519,327 B1 | 2/2003 | Cannon et al. |
| 6,519,571 B1 | 2/2003 | Guheen et al. |
| 6,524,274 B1 | 2/2003 | Rosenthal et al. |
| 6,526,274 B1 | 2/2003 | Fickes et al. |
| 6,549,612 B2 | 4/2003 | Gifford et al. |
| 6,553,563 B2 | 4/2003 | Ambrose et al. |
| 6,587,871 B1 | 7/2003 | Schrader |
| 6,618,763 B1 | 9/2003 | Steinberg |
| 6,629,138 B1 | 9/2003 | Lambert et al. |
| 6,671,800 B1 | 12/2003 | McInally et al. |
| 6,683,940 B2 | 1/2004 | Contractor |
| 6,714,778 B2 | 3/2004 | Nykänen et al. |
| 6,718,544 B1 * | 4/2004 | Humphreys et al. ........... 717/158 |
| 6,721,398 B1 | 4/2004 | Pitcher |
| 6,725,205 B1 | 4/2004 | Weiler et al. |
| 6,731,927 B1 | 5/2004 | Stern et al. |
| 6,785,367 B2 | 8/2004 | Horvath et al. |
| 6,832,373 B2 | 12/2004 | O'Neill |
| 6,853,714 B2 | 2/2005 | Liljestrand et al. |
| 6,871,346 B1 | 3/2005 | Kumbalimutt et al. |
| 6,937,724 B2 | 8/2005 | Kozdon et al. |
| 6,940,954 B1 * | 9/2005 | Toebes ........................ 379/88.17 |
| 6,947,989 B2 | 9/2005 | Gullotta et al. |
| 6,950,502 B1 | 9/2005 | Jenkins |
| 6,950,990 B2 | 9/2005 | Rajarajan et al. |
| 6,952,558 B2 | 10/2005 | Hardacker |
| 6,957,186 B1 | 10/2005 | Guheen et al. |
| 6,996,413 B2 | 2/2006 | Inselberg |
| 7,068,668 B2 | 6/2006 | Feuer |
| 7,072,934 B2 | 7/2006 | Helgeson et al. |
| 7,082,469 B2 | 7/2006 | Gold et al. |
| 7,092,504 B1 | 8/2006 | Buller |
| 7,136,461 B1 | 11/2006 | Swingle et al. |
| 7,136,865 B1 | 11/2006 | Ra et al. |
| 7,151,823 B2 | 12/2006 | Durkin |
| 7,167,550 B2 | 1/2007 | Klos et al. |
| 7,203,288 B1 | 4/2007 | Dwyer et al. |
| 7,222,156 B2 | 5/2007 | Gupta et al. |
| 7,281,269 B1 | 10/2007 | Sievers et al. |
| 7,317,788 B2 | 1/2008 | Caspi et al. |
| 7,320,121 B2 * | 1/2008 | Krueger ........................ 717/106 |
| 7,325,230 B2 * | 1/2008 | Uchida ........................ 717/140 |
| 7,379,540 B1 | 5/2008 | Van Gundy |
| 7,515,695 B1 * | 4/2009 | Chan et al. .................. 379/88.18 |
| 7,519,984 B2 | 4/2009 | Bhogal et al. |
| 7,584,452 B1 * | 9/2009 | Johnson ........................ 717/116 |
| 7,680,820 B2 | 3/2010 | Denoue et al. |
| 7,693,267 B2 | 4/2010 | Howell et al. |
| 2001/0032332 A1 * | 10/2001 | Ward et al. ........................ 717/9 |
| 2002/0032752 A1 | 3/2002 | Gold et al. |
| 2002/0049749 A1 | 4/2002 | Helgeson et al. |
| 2002/0064149 A1 * | 5/2002 | Elliott et al. .................. 370/352 |
| 2002/0115454 A1 | 8/2002 | Hardacker |
| 2002/0123331 A1 | 9/2002 | Lehaff et al. |
| 2002/0123342 A1 | 9/2002 | Lehaff et al. |
| 2002/0131573 A1 | 9/2002 | Berkley et al. |
| 2002/0143877 A1 | 10/2002 | Hackbarth et al. |
| 2002/0147801 A1 | 10/2002 | Gullotta et al. |
| 2002/0165986 A1 | 11/2002 | Tarnoff |
| 2002/0169876 A1 | 11/2002 | Curie et al. |
| 2002/0188453 A1 | 12/2002 | Hirschberg et al. |
| 2003/0028603 A1 | 2/2003 | Aktas et al. |
| 2003/0046421 A1 | 3/2003 | Horvitz et al. |
| 2003/0050046 A1 | 3/2003 | Conneely et al. |
| 2003/0128820 A1 | 7/2003 | Hirschberg et al. |
| 2003/0140112 A1 | 7/2003 | Ramachandran et al. |
| 2003/0195934 A1 | 10/2003 | Peterson et al. |
| 2003/0220784 A1 | 11/2003 | Fellenstein et al. |
| 2003/0220975 A1 | 11/2003 | Malik |
| 2004/0002325 A1 | 1/2004 | Evans et al. |
| 2004/0019644 A1 | 1/2004 | Fellenstein et al. |
| 2004/0022379 A1 | 2/2004 | Klos et al. |
| 2004/0039786 A1 | 2/2004 | Horvitz et al. |
| 2004/0044687 A1 | 3/2004 | Vachuska et al. |
| 2004/0044989 A1 | 3/2004 | Vachuska et al. |
| 2004/0049696 A1 | 3/2004 | Baker et al. |
| 2004/0062368 A1 | 4/2004 | Durkin |
| 2004/0064317 A1 | 4/2004 | Othmer et al. |
| 2004/0064502 A1 | 4/2004 | Yellepeddy et al. |
| 2004/0109544 A1 | 6/2004 | Didcock et al. |
| 2004/0111702 A1 | 6/2004 | Chan |
| 2004/0120480 A1 | 6/2004 | Didcock et al. |
| 2004/0121761 A1 | 6/2004 | Tripathy et al. |
| 2004/0146144 A1 | 7/2004 | Gao et al. |
| 2004/0171381 A1 | 9/2004 | Inselberg |
| 2004/0186861 A1 | 9/2004 | Phatak |
| 2004/0199587 A1 | 10/2004 | McKnight |
| 2004/0225525 A1 | 11/2004 | Weitzman |
| 2004/0253956 A1 | 12/2004 | Collins |
| 2004/0258231 A1 | 12/2004 | Elsey et al. |
| 2004/0267768 A1 | 12/2004 | Harjanto |
| 2005/0013419 A1 | 1/2005 | Pelaez et al. |
| 2005/0018821 A1 | 1/2005 | Darsin et al. |
| 2005/0025297 A1 | 2/2005 | Finnigan |
| 2005/0064883 A1 * | 3/2005 | Heck et al. .................... 455/466 |
| 2005/0091226 A1 | 4/2005 | Lin et al. |
| 2005/0132266 A1 | 6/2005 | Ambrosino et al. |
| 2005/0216421 A1 | 9/2005 | Barry et al. |
| 2006/0031340 A1 | 2/2006 | Mathew et al. |
| 2006/0059107 A1 | 3/2006 | Elmore et al. |
| 2006/0072720 A1 | 4/2006 | Blohm |
| 2006/0177005 A1 | 8/2006 | Shaffer et al. |
| 2006/0177006 A1 | 8/2006 | Frifeldt et al. |
| 2006/0177007 A1 | 8/2006 | Vaghar et al. |
| 2006/0177009 A1 | 8/2006 | Skakkebaek et al. |
| 2006/0177010 A1 | 8/2006 | Skakkebaek et al. |
| 2006/0177011 A1 * | 8/2006 | Skakkebaek et al. ........ 379/67.1 |
| 2006/0177012 A1 | 8/2006 | Forney et al. |
| 2006/0177013 A1 | 8/2006 | Frifeldt et al. |
| 2006/0177014 A1 | 8/2006 | Skakkebaek et al. |
| 2006/0177015 A1 | 8/2006 | Skakkebaek et al. |
| 2006/0177023 A1 | 8/2006 | Vaghar et al. |
| 2006/0177024 A1 | 8/2006 | Frifeldt et al. |
| 2006/0177025 A1 | 8/2006 | Frifeldt et al. |
| 2006/0223502 A1 | 10/2006 | Doulton |
| 2006/0234680 A1 | 10/2006 | Doulton |
| 2006/0274856 A1 | 12/2006 | Dunn et al. |
| 2007/0005713 A1 | 1/2007 | LeVasseur et al. |
| 2007/0127638 A1 | 6/2007 | Doulton |
| 2007/0174388 A1 | 7/2007 | Williams |
| 2008/0133548 A1 | 6/2008 | Skakkebaek et al. |
| 2008/0175235 A1 | 7/2008 | Frifeldt et al. |
| 2008/0198979 A1 | 8/2008 | Skakkebaek et al. |
| 2008/0198980 A1 | 8/2008 | Skakkebaek et al. |

(56) References Cited

U.S. PATENT DOCUMENTS

| | | |
|---|---|---|
| 2008/0198981 A1 | 8/2008 | Skakkebaek et al. |
| 2008/0279350 A1 | 11/2008 | Skakkebaek et al. |
| 2010/0184409 A1 | 7/2010 | Doulton |

OTHER PUBLICATIONS

"Administrator's Guide," Adomo, Inc., http://support.adomo.com/3.1/adminguide/, for Sep. 2003 release.
Adomo AdomoMCS, undated brochure.
CMP Media LLC, "Adomo Launches Mobile Communications Server," Computer Telephony, Apr. 2001.
Official Action for U.S. Appl. No. 11/053,271, mailed Dec. 1, 2009.
Official Action for U.S. Appl. No. 11/053,147, mailed Dec. 9, 2009.
Official Action for U.S. Appl. No. 11/053,411, mailed Sep. 30, 2009.
Final Official Action for U.S. Appl. No. 12/016,365, mailed Oct. 13, 2009.
Official Action for U.S. Appl. No. 11/053,411, mailed Mar. 16, 2010.
Official Action for U.S. Appl. No. 12/016,350, mailed Dec. 29, 2009.
Official Action for U.S. Appl. No. 11/053,411, mailed Sep. 20, 2010.
Notice of Allowability for U.S. Appl. No. 12/016,350, mailed Nov. 9, 2010.
Notice of Allowability for U.S. Appl. No. 12/016,365, mailed Sep. 16, 2010.
Notice of Allowance for U.S. Appl. No. 11/053,425, mailed Jan. 4, 2010.
Notice of Allowability for U.S. Appl. No. 11/053,271, mailed Jun. 3, 2010.
Official Action for U.S. Appl. No. 12/016,365, mailed Mar. 29, 2010.
Official Action for U.S. Appl. No. 11/053,147, mailed Jun. 25, 2010.
Official Action for U.S. Appl. No. 12/016,350, mailed Jun. 30, 2010.
Official Action for U.S. Appl. No. 11/053,054, mailed Jun. 7, 2010.
Extended European Search Report for European Patent Application No. 08705860,8, dated Nov. 24, 2010.
Official Action for U.S. Appl. No. 11/053,054, mailed Dec. 29, 2010.
U.S. Appl. No. 13/022,770, filed Feb. 8, 2011 Skakkebaek et al.
Official Action (including translation) for Chinese Patent Application No. 200880012076.9, dated Mar. 21, 2011.
Official Action for U.S. Appl. No. 11/709,475, mailed May 31, 2011.
Official Action for U.S. Appl. No. 11/709,513, mailed Jun. 13, 2011.
International Search Report for International (PCT) Application No. PCT/US08/50835, mailed Mar. 31, 2008.
Written Opinion for International (PCT) Application No. PCT/US08/50835, mailed Mar. 31, 2008.
International Preliminary Report on Patentability for International (PCT) Application No. PCT/US08/50835, issued Aug. 26, 2009.
International Search Report for International (PCT) Application No. PCT/US2008/050840, mailed Apr. 15, 2008.
Written Opinion for International (PCT) Application No. PCT/US2008/050840, mailed Apr. 15, 2008.
International Preliminary Report on Patentability for International (PCT) Application No. PCT/US2008/050840, Issued Aug. 26, 2009.
International Search Report for International (PCT) Application No. PCT/US2008/050842, mailed Apr. 30, 2008.
Written Opinion for International (PCT) Application No. PCT/US2008/050842, mailed Apr. 30, 2008.
International Preliminary Report on Patentability for International (PCT) Application No. PCT/US2008/050842, issued Aug. 26, 2009.
Official Action for U.S. Appl. No. 11/053,376, mailed Jul. 19, 2006.
Official Action for U.S. Appl. No. 11/053,376, mailed Apr. 5, 2007.
Official Action for U.S. Appl. No. 11/053,376, mailed Nov. 16, 2007.
Official Action for U.S. Appl. No. 11/053,376, mailed Sep. 5, 2008.
Official Action for U.S. Appl. No. 11/053,539, mailed Aug. 11, 2006.
Official Action for U.S. Appl. No. 11/053,539, mailed May 14, 2007.
Official Action for U.S. Appl. No. 11/053,538, mailed Jul. 6, 2006.
Official Action for U.S. Appl. No. 11/053,538, mailed Mar. 22, 2007.
Official Action for U.S. Appl. No. 11/053,538, mailed Nov. 27, 2007.
Official Action for U.S. Appl. No. 11/053,736, mailed Aug. 19, 2008.
Official Action for U.S. Appl. No. 11/053,271, mailed Apr. 3, 2008.
Official Action for U.S. Appl. No. 11/053,271, mailed Jan. 7, 2009.
Official Action for U.S. Appl. No. 11/053,147, mailed Apr. 3, 2009.
Official Action for U.S. Appl. No. 11/053,411, mailed Apr. 23, 2008.
Official Action for U.S. Appl. No. 11/053,411, mailed Dec. 31, 2008.
Official Action for U.S. Appl. No. 12/016,350, mailed Apr. 29, 2009.
Official Action for U.S. Appl. No. 12/016,365, mailed Nov. 10, 2008.
Official Action for U.S. Appl. No. 11/053,054, mailed Jun. 28, 2006.
Official Action for U.S. Appl. No. 11/053,054, mailed Nov. 15, 2007.
Official Action for U.S. Appl. No. 11/053,054, mailed Jun. 3, 2008.
Official Action for U.S. Appl. No. 11/053,054, mailed May 26, 2009.
Official Action for U.S. Appl. No. 11/053,425, mailed Jul. 10, 2008.
Official Action for U.S. Appl. No. 11/053,425, mailed Apr. 13, 2009.
Official Action for U.S. Appl. No. 11/053,054, mailed Mar. 21, 2007.
Official Action for U.S. Appl. No. 12/016,350, mailed Mar. 24, 2010.

* cited by examiner

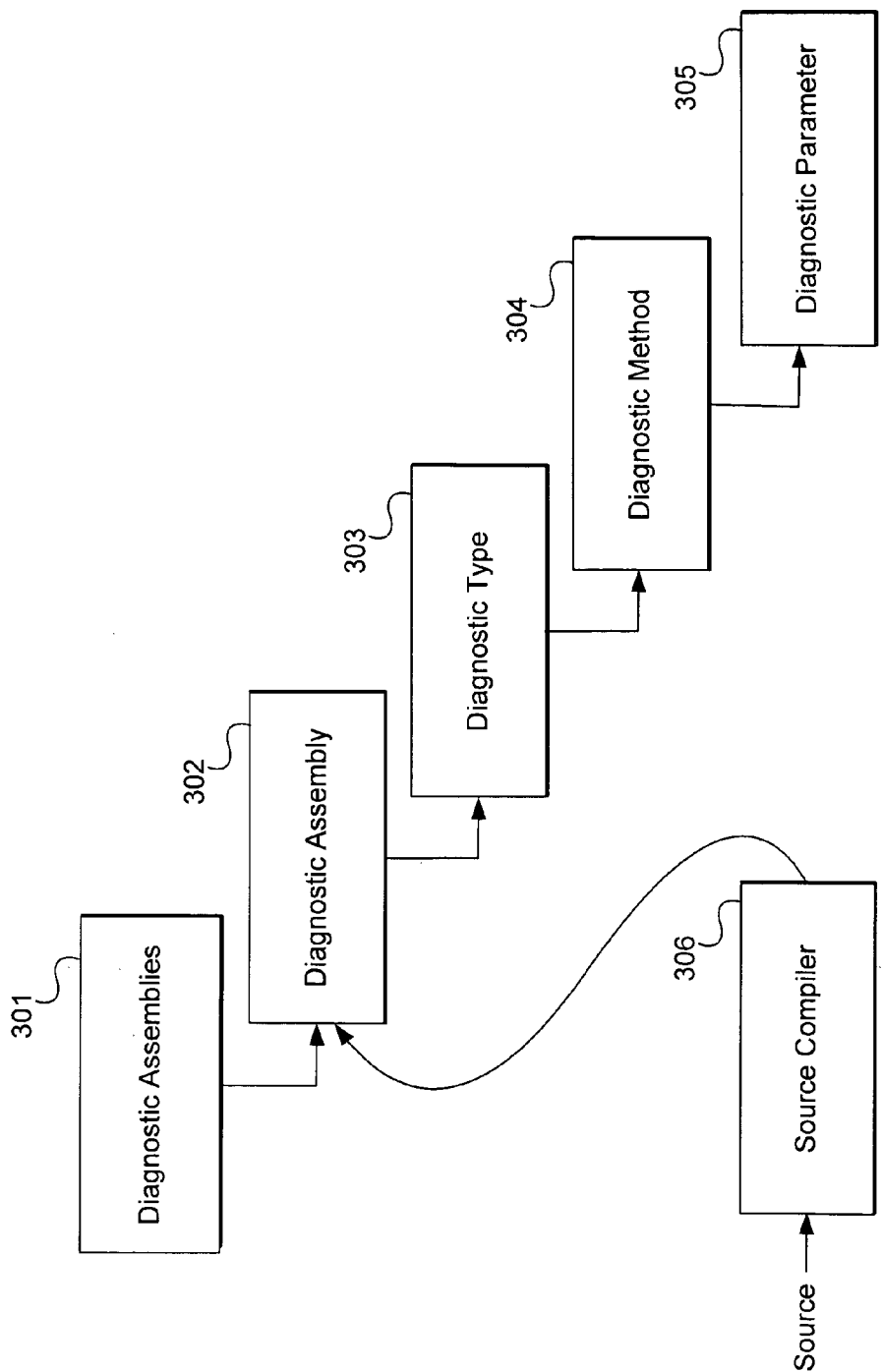

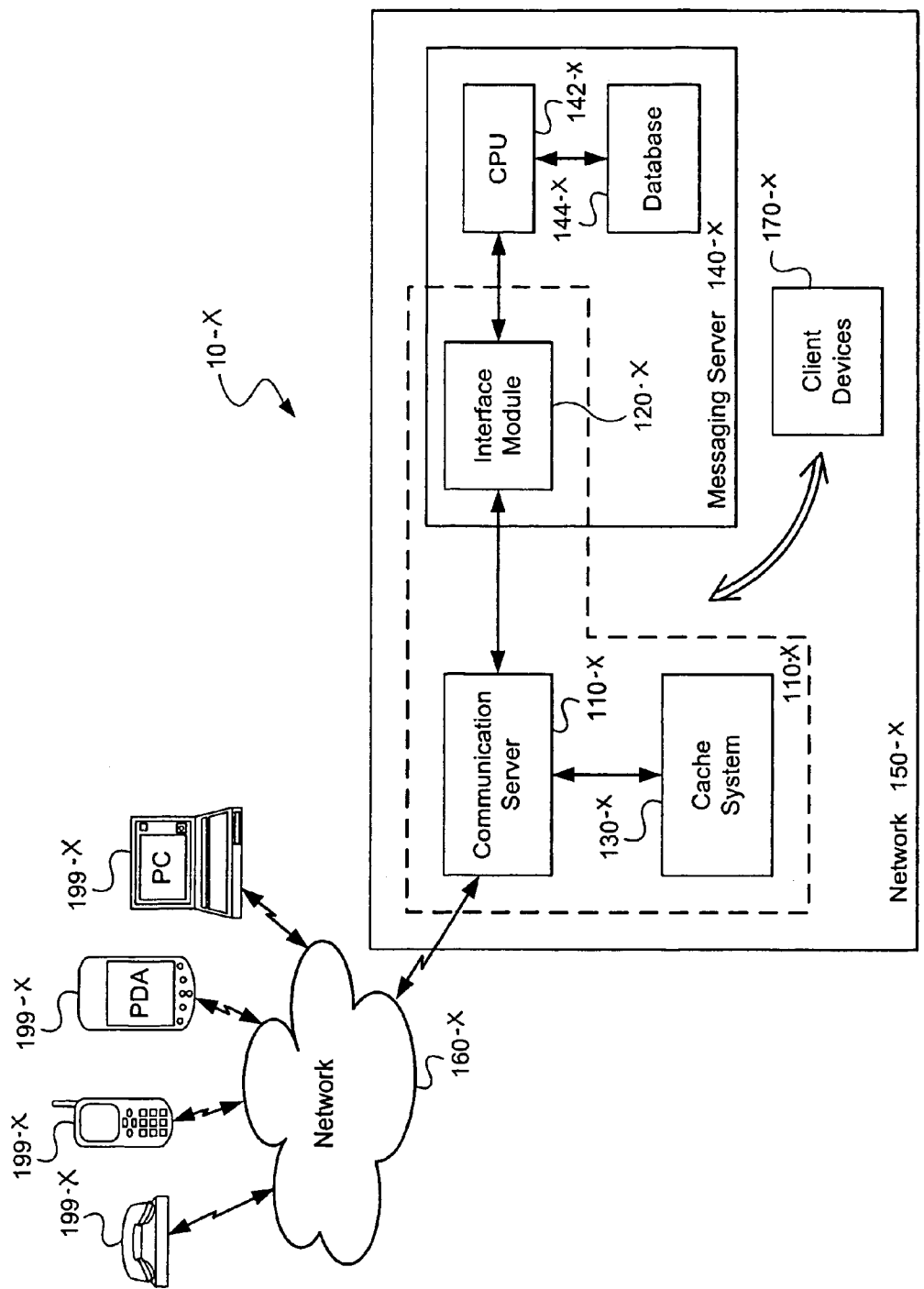
FIG. 1-X

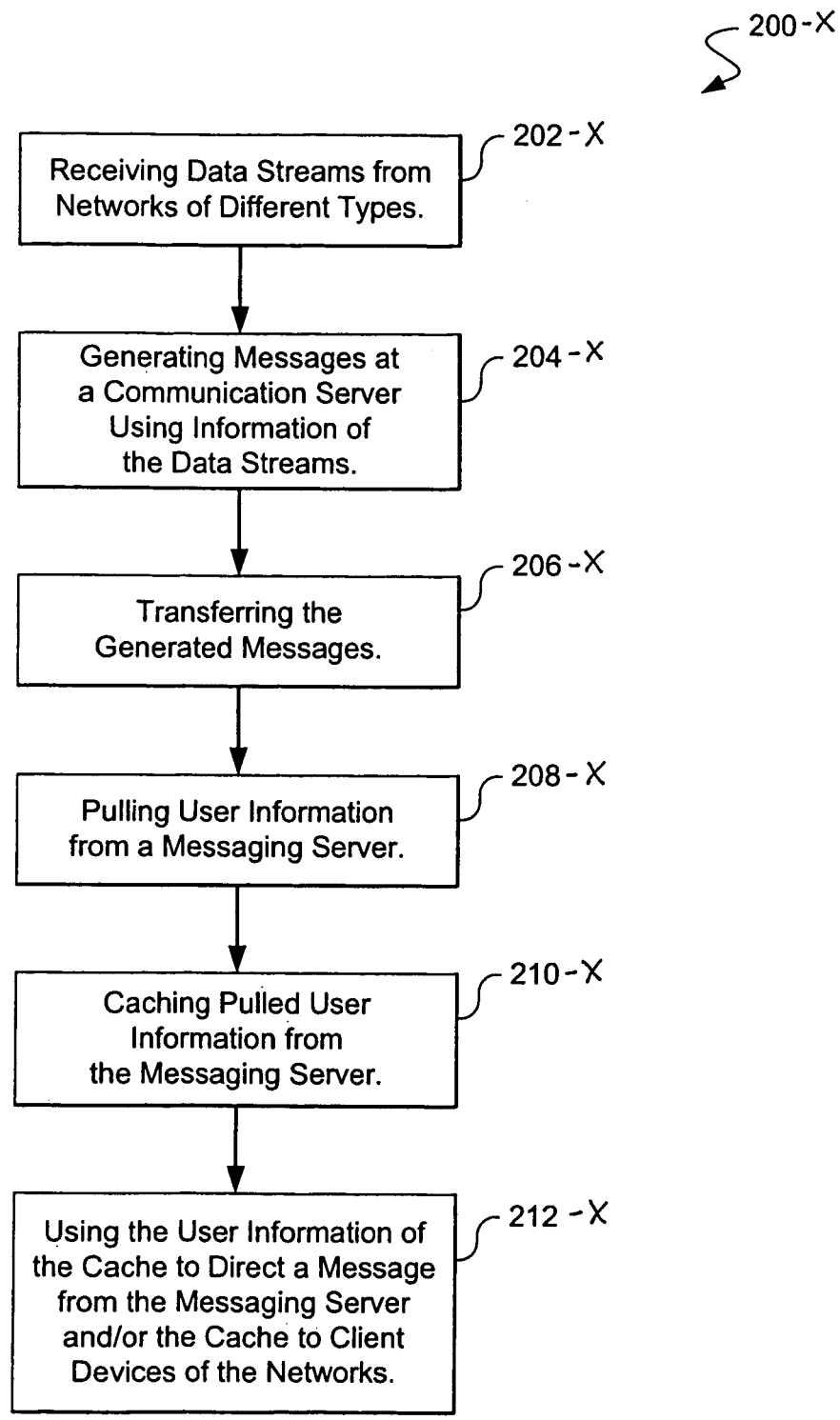
FIG. 2-X

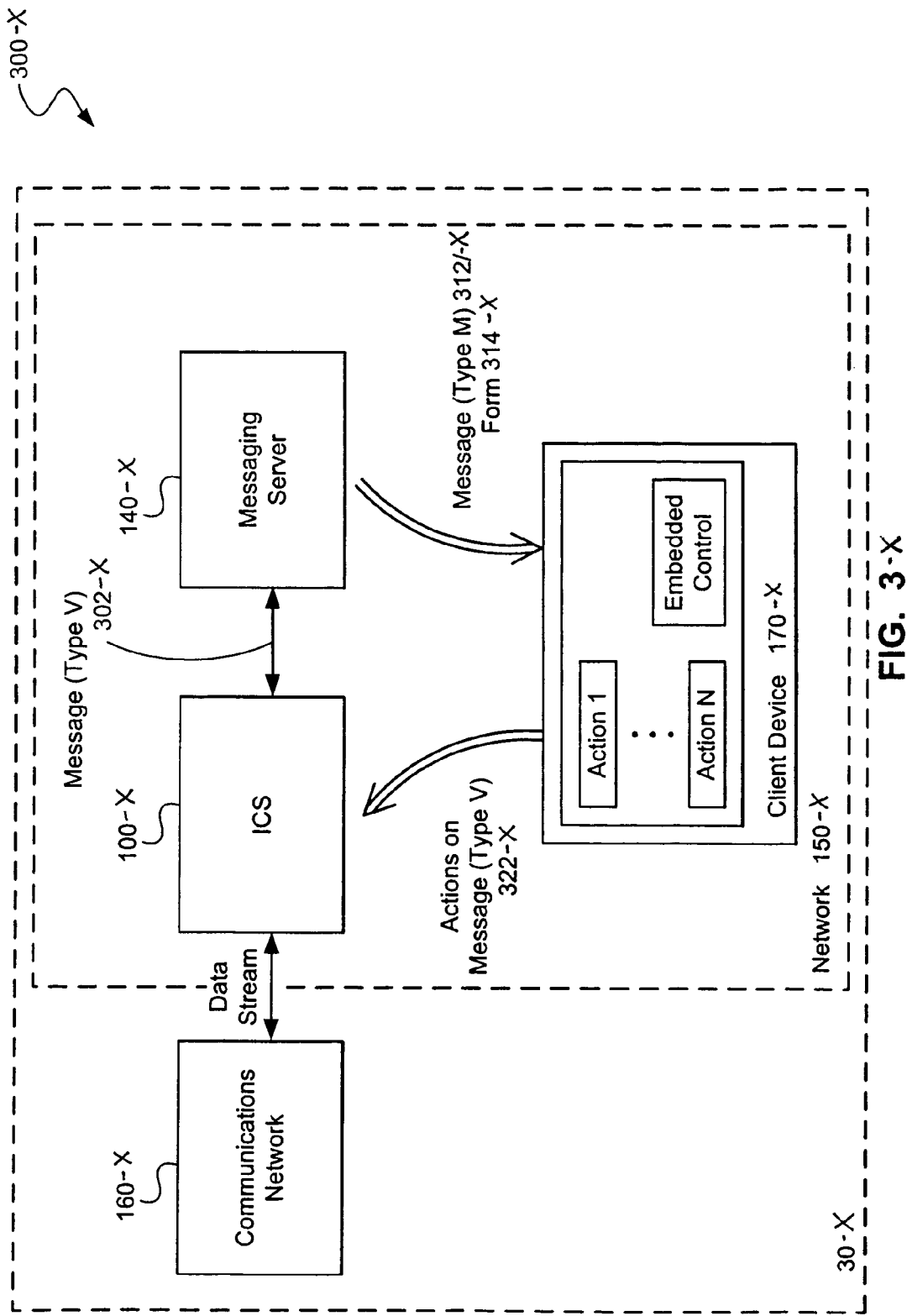
FIG. 3-X

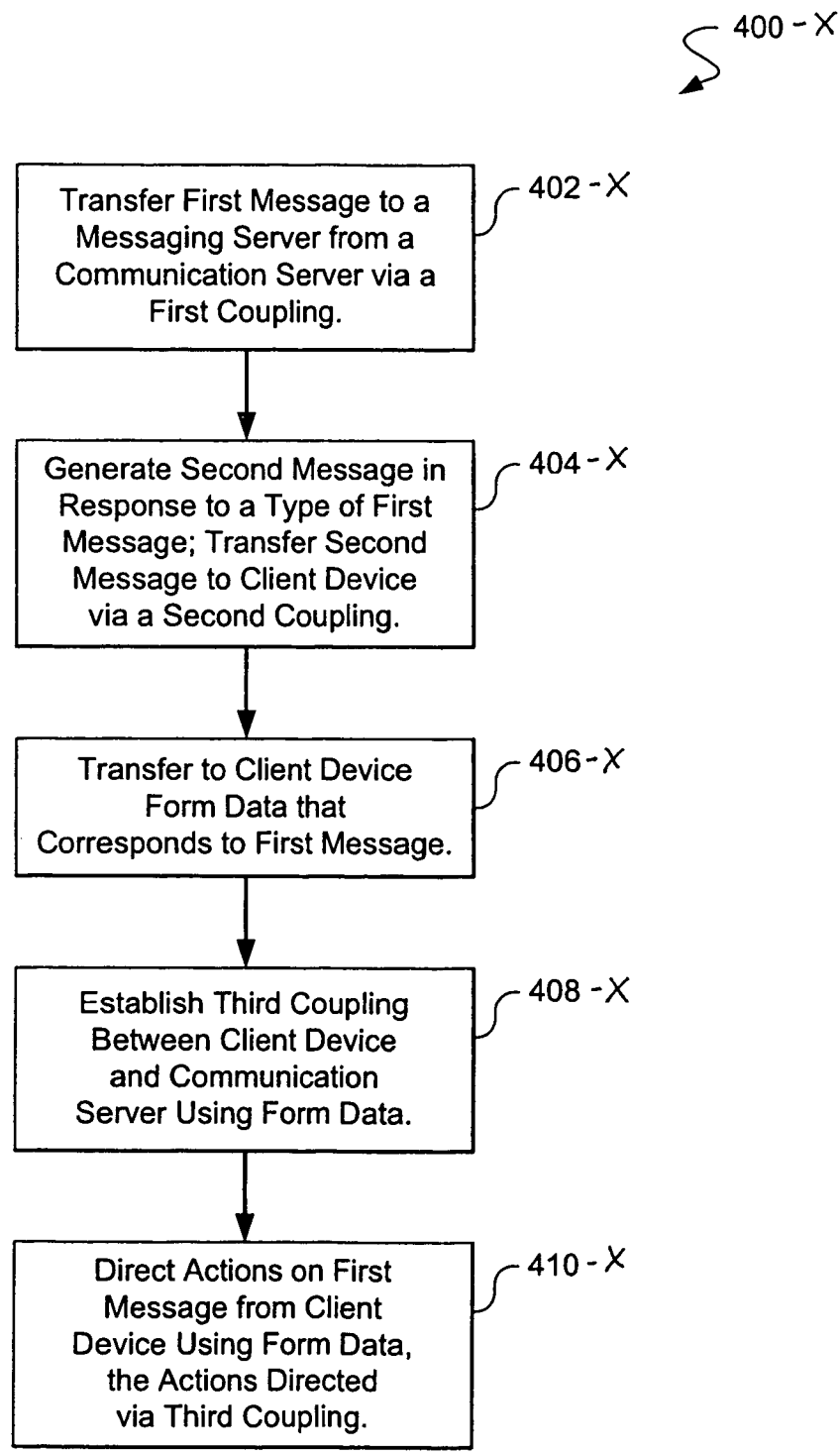
FIG. 4-X

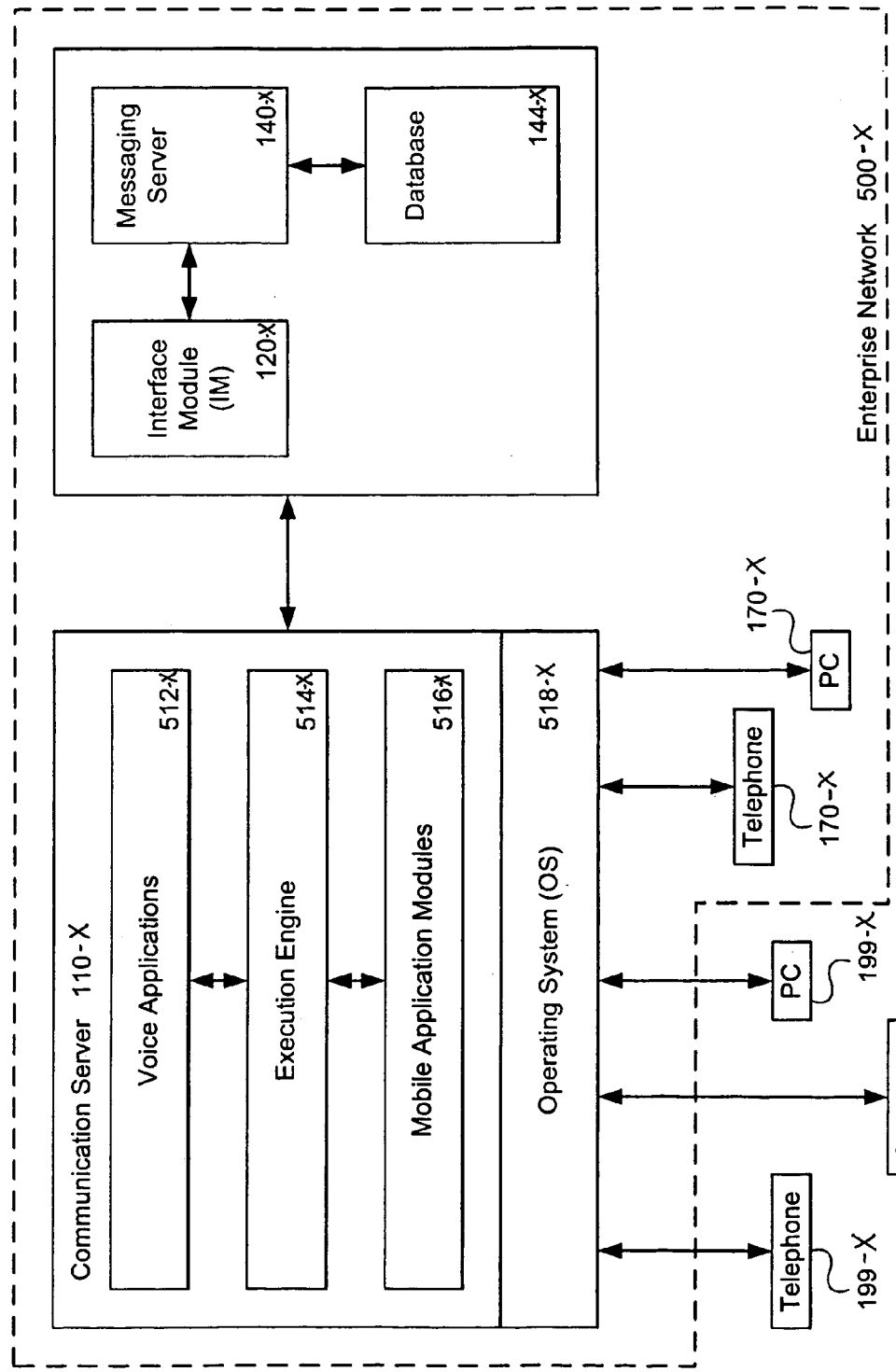
FIG. 5-X

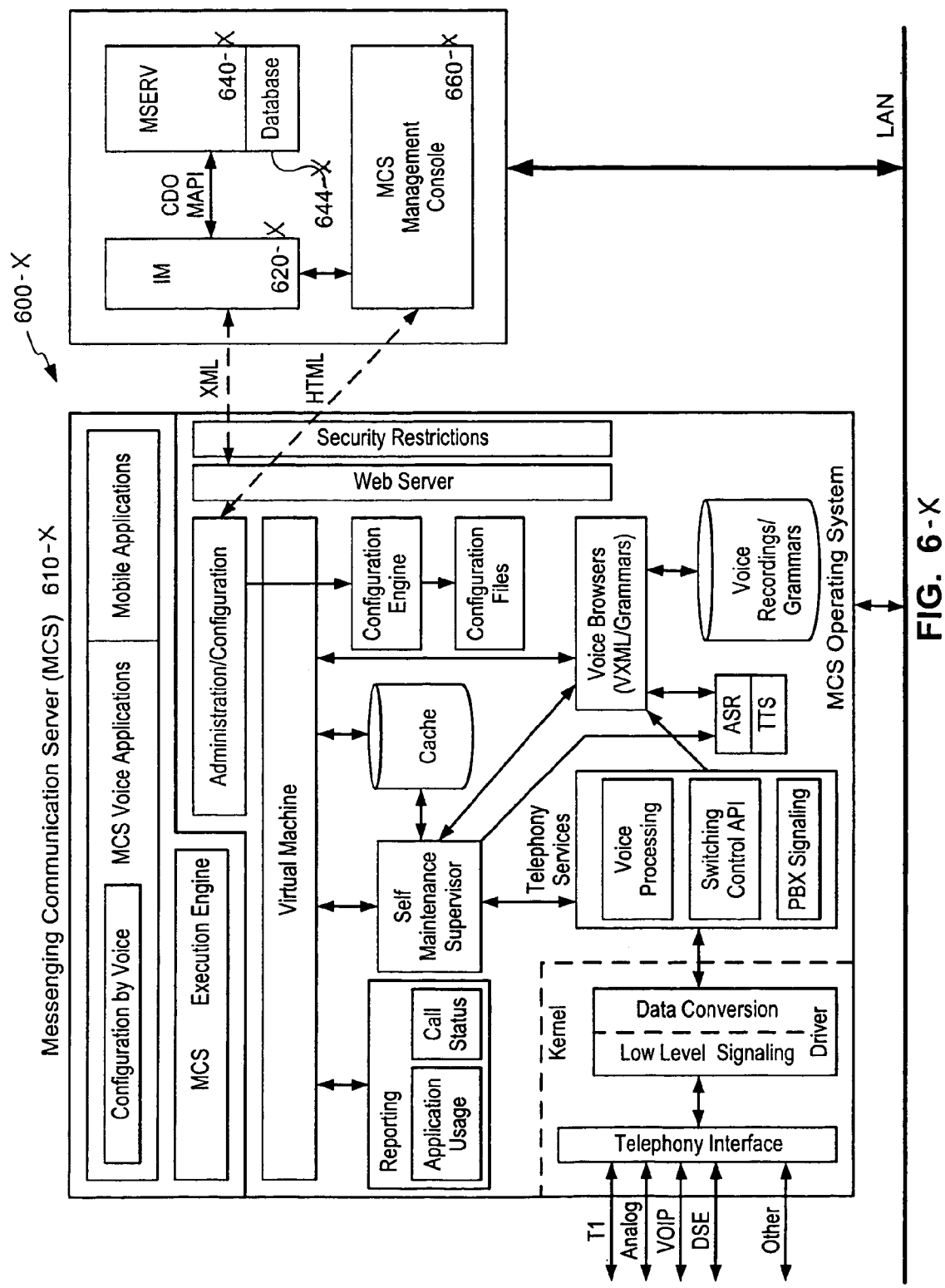

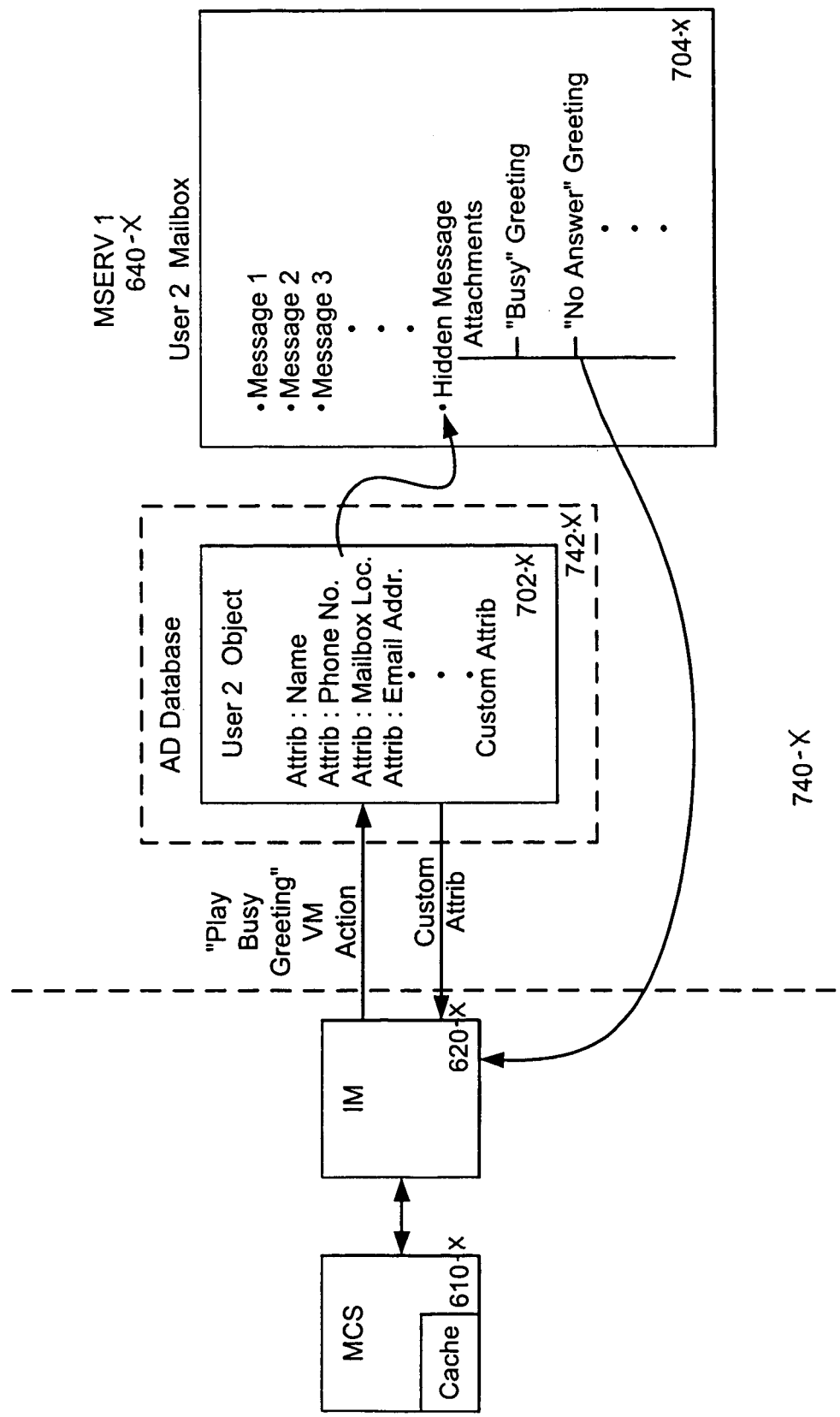
FIG. 7-X

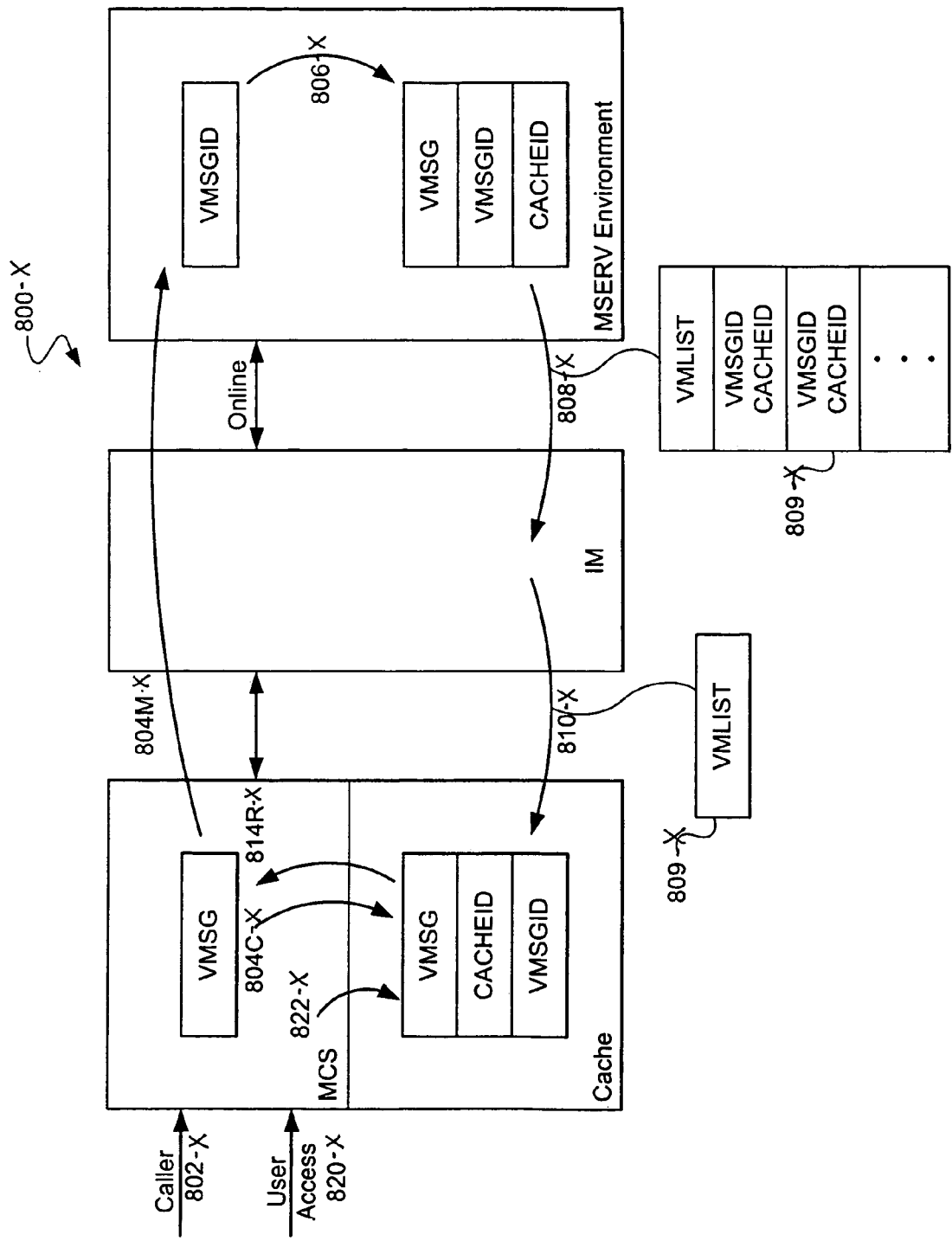
FIG. 8-X

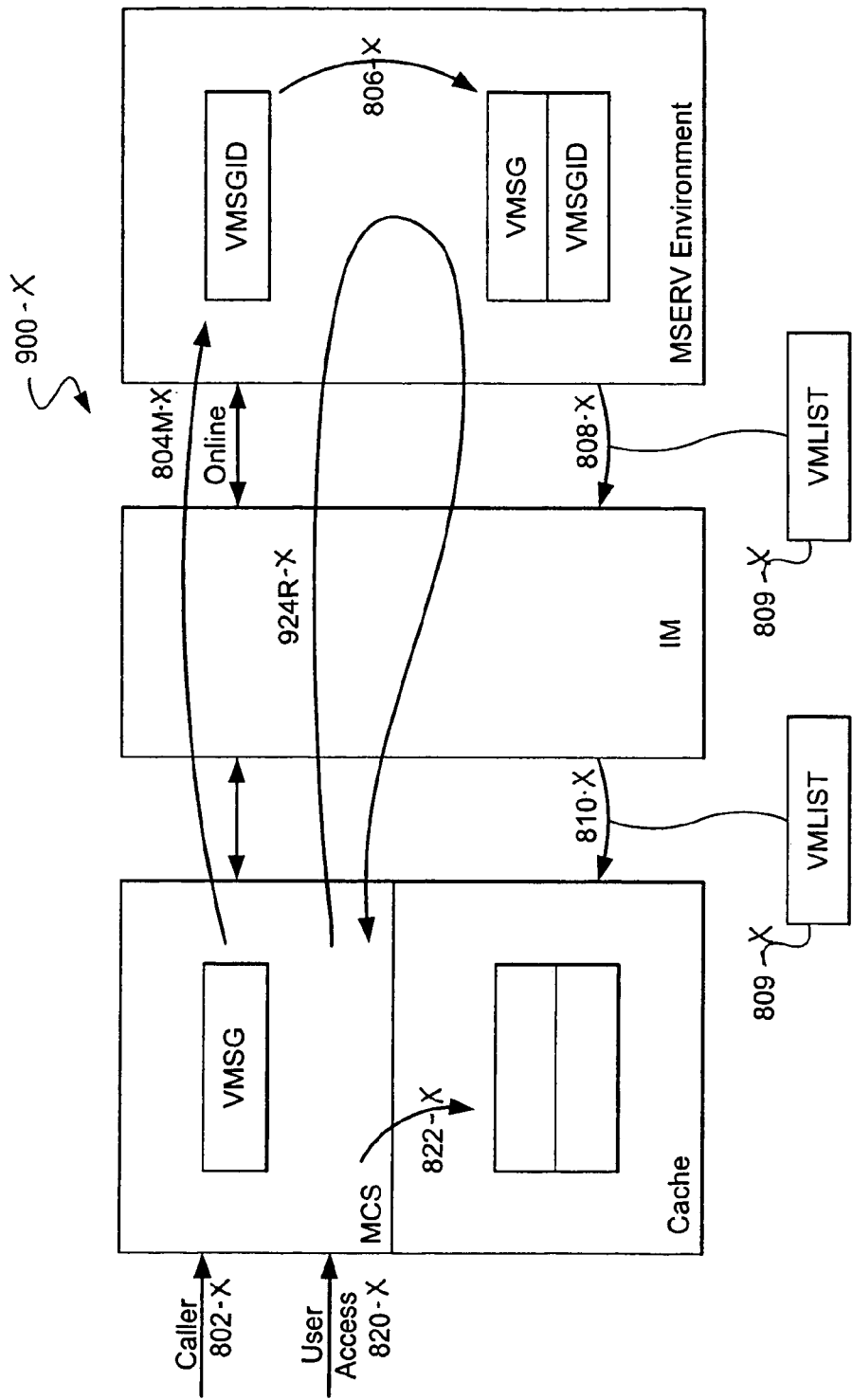
FIG. 9-X

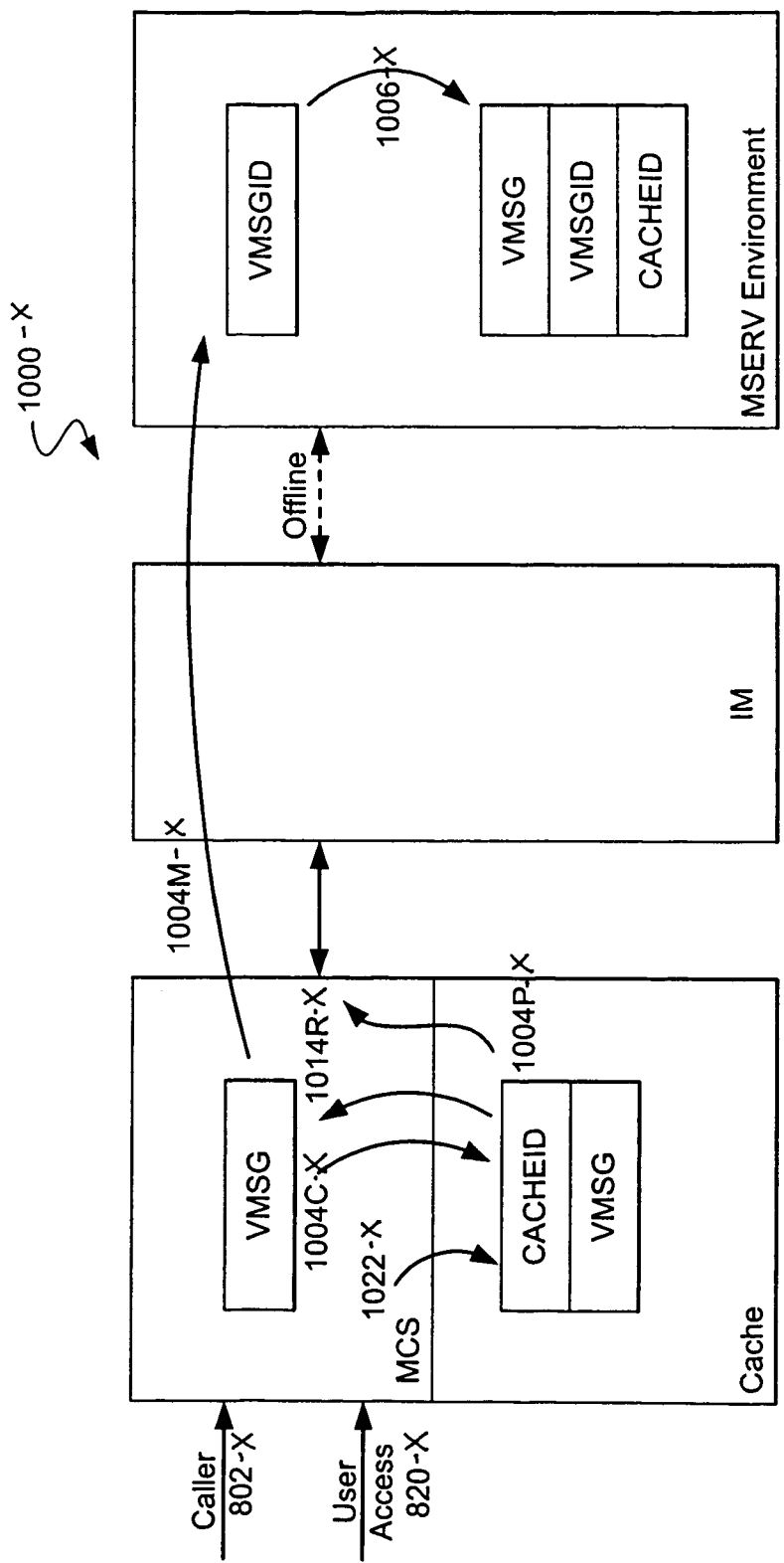
FIG. 10-X

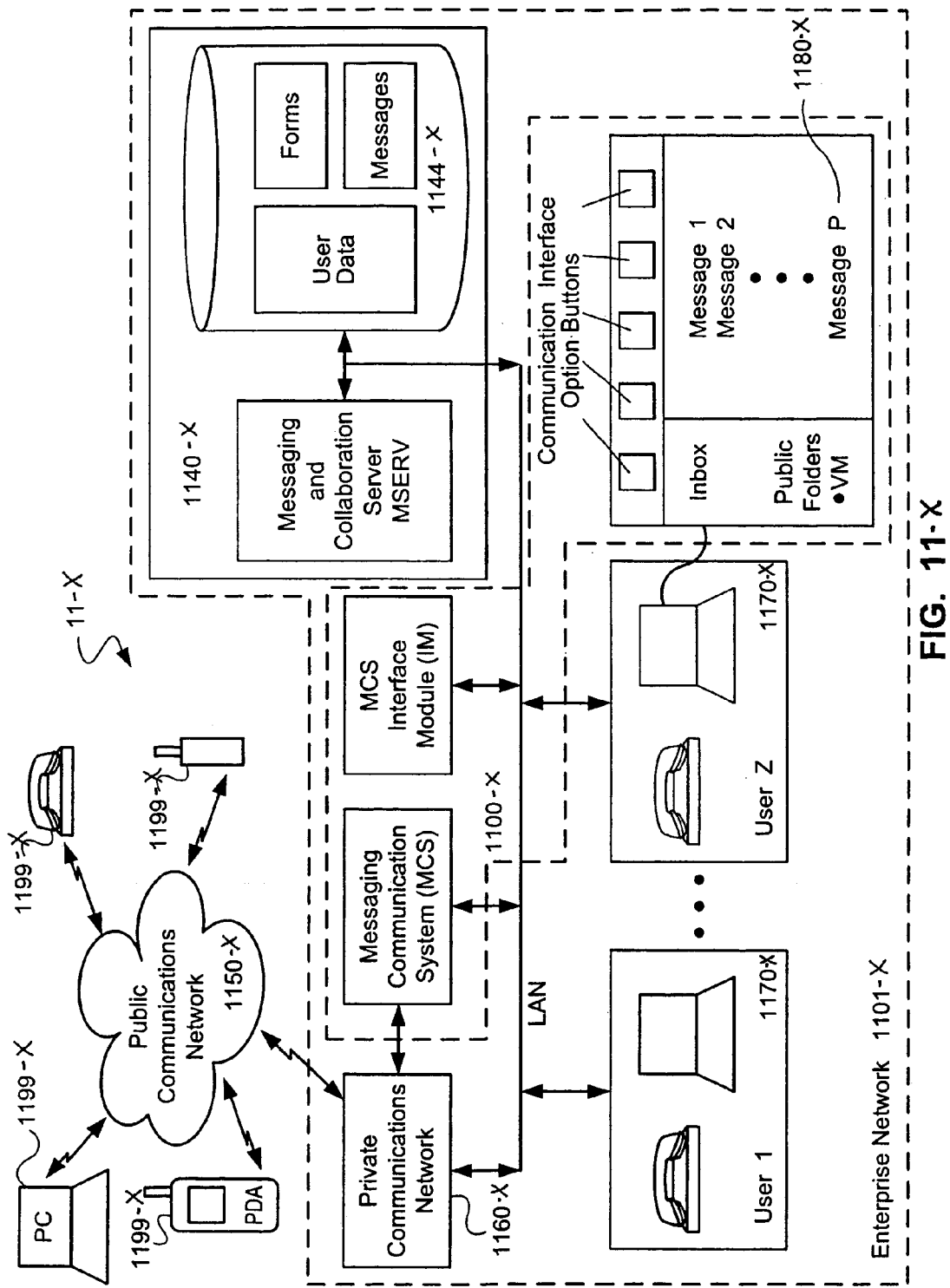
FIG. 11-X

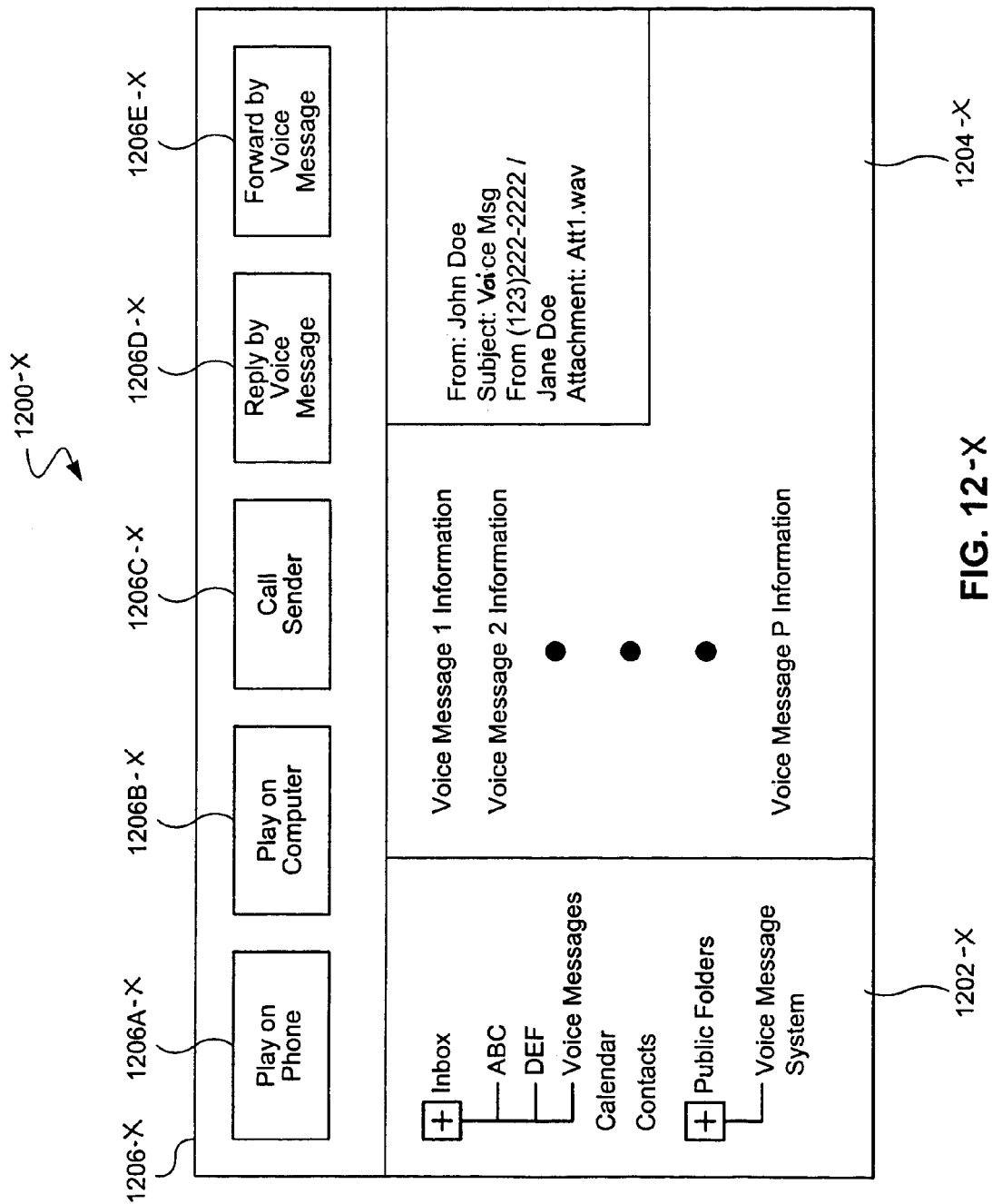

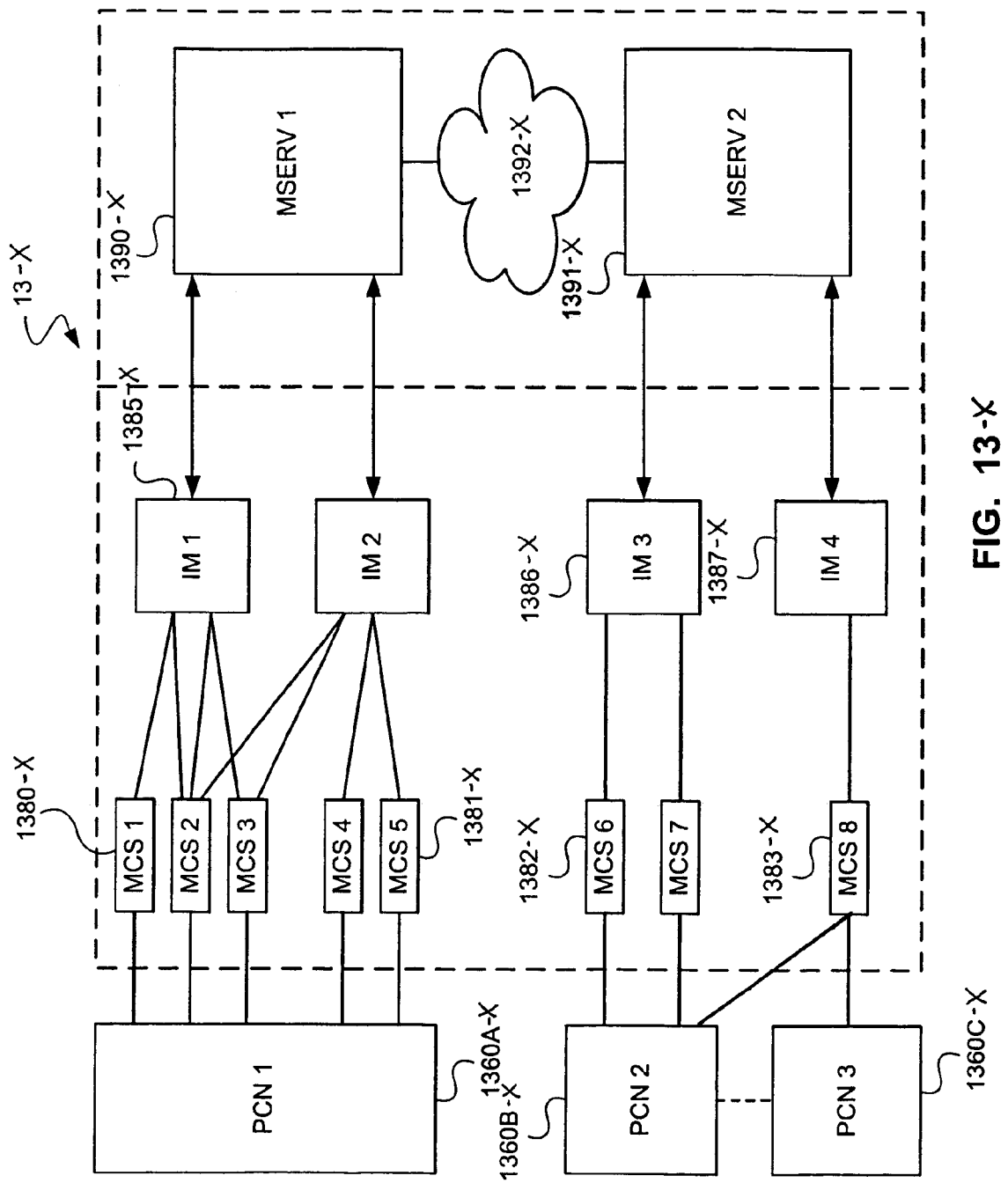
FIG. 13-X

EXTENSIBLE DIAGNOSTIC TOOL

CROSS-REFERENCE

This application is related to the following U.S. patent applications:

Integrated Multi-Media Communication System, U.S. application Ser. No. 11/053,271, invented by Jens Skakkebaek, Heine Frifeldt, and Anthony Shaffer, filed Feb. 7, 2005;

Form-Based User Interface For Controlling Messaging, U.S. application Ser. No. 11/053,537, invented by Heine Frifeldt, Anthony Shaffer, and Willem R. B. Potze, filed Feb. 7, 2005;

Controlling Messaging Actions Using Form-Based User Interface, U.S. application Ser. No. 11/053,146, invented by Heine Frifeldt, Anthony Shaffer, and Willem R. B. Potze, filed Feb. 7, 2005;

Caching Message Information In An Integrated Communication System, U.S. application Ser. No. 11/053,147, invented by Shahriar Vaghar, Yang Wang, and Jens Skakkebaek, filed Feb. 7, 2005;

Distributed Cache System, U.S. application Ser. No. 11/053,411, invented by Shahriar Vaghar, Yang Wang, and Jens Skakkebaek, filed Feb. 7, 2005;

Caching User Information In An Integrated Communication System, U.S. application Ser. No. 11/053,272, invented by Jens Skakkebaek, Willem R. B. Potze, and Heine Frifeldt, filed Feb. 7, 2005;

Integrating Messaging Server Directory Service With Communication System Voice Mail Message Interface, U.S. application Ser. No. 11/053,709, invented by Heine Frifeldt, David Forney, and Anthony Shaffer, filed Feb. 7, 2005;

Improved Message Data Access In Multi-Media Communication System, U.S. application Ser. No. 11/053,736, invented by Jens Skakkebaek and Heine Frifeldt, filed Feb. 7, 2005;

System And Method For Voicemail Privacy, U.S. application Ser. No. 11/053,054, invented by Anthony Shaffer, Heine Frifeldt and David Forney, filed Feb. 7, 2005;

Networked Voicemail, U.S. application Ser. No. 11/053,425, invented by David Forney, Jens Skakkebaek, Heine Frifeldt, and Anthony Shaffer, filed Feb. 7, 2005;

System And Method For Providing Data On Voicemail Appliance, U.S. application Ser. No. 11/053,538, invented by Jens Skakkebaek and Lutz Birkhahn, filed Feb. 7, 2005;

Integrated Voice Mail User/Email System User Setup in Integrated Multi-Media Communication System, U.S. application Ser. No. 11/053,539, invented by Heine Frifeldt, David Forney, and Anthony Shaffer, filed Feb. 7, 2005; and System And Method For Providing Code On Voicemail Appliance, U.S. application Ser. No. 11/053.376, invented by Jens Skakkebaek and Lutz Birkhahn, filed Feb. 7, 2005.

Each of the foregoing applications is incorporated herein by reference in its entirety.

TECHNICAL FIELD

The disclosure herein relates generally to communication systems, and more particularly to integrated communication and messaging systems.

BACKGROUND

As methods of communication continue to proliferate, enterprises continue to desire integrated systems for handling all aspects of multi-media communication for enterprise users. An enterprise can be any collection of users of communication media having some common purpose, but a typical example is a company with one or more sites and some number of employees who are users of communication media. Communication media include electronic mail ("email") messaging, Short Messaging Service ("SMS") messaging, voice messaging, and more. Users receive and send messages over a variety of wired and wireless networks via a variety of devices, such as desktop computers, wired phones, wireless devices (e.g., phones and personal digital assistants ("PDAs")), and more.

Enterprises currently have the ability to centralize and manage email messaging using commercially available groupware that centrally stores information about all of the users and their messages. Enterprises also have the ability to centrally manage traditional voice messaging using a Private Branch Exchange ("PBX"). However, the systems for managing email messaging and the systems for managing voice mail messaging are not at all well integrated. For example, when a new user is added to the enterprise, a system administrator for the enterprise sets up the user in the email system using the groupware application and its set methods, data and protocols. In addition, a different administrator specializing in telephony must set up the user in the voice messaging system using different methods, data and protocols. Voice data and email data are typically stored in separate databases. Both initial user setup and updating user information are complicated by the fact that the email and voice systems are so distinct.

The management of and access to the voice mail message information and email information in the enterprise is also complicated by the current lack of integration of the two (voice and email) systems. There are various challenges to be overcome if one were to attempt to integrate the two systems.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIG. 3 is a relationship diagram of diagnostic assemblies, according to an embodiment of the invention.

FIG. 1-X is a block diagram of a system that includes an integrated communication system ("ICS"), under an embodiment.

FIG. 2-X is a flow diagram for providing integrated communication processes using the ICS, under an embodiment.

FIG. 3-X is a block diagram of example information flows in a system that includes the ICS, under an embodiment.

FIG. 4-X is another flow diagram for providing integrated communication processes using the ICS, under an embodiment.

FIG. 5-X is a block diagram of an enterprise network system that includes a communication server and Interface Module ("IM") of an ICS, under an embodiment.

FIG. 6-X is a block diagram of an enterprise network system that includes the ICS, under an embodiment.

FIG. 7-X is a block diagram that shows interactions between the IM and components of a messaging server ("MSERV") environment, under an embodiment.

FIG. 8-X is an information flow for routing and accessing voice mail messages via the ICS when the MSERV is in an online state, under an embodiment.

FIG. 9-X is an alternative information flow for routing and accessing voice mail messages via the ICS when the MSERV is in an online state, under an embodiment.

FIG. 10-X is an information flow for routing and accessing voice mail messages via the ICS when the MSERV is in an offline state, under an embodiment.

FIG. 11-X is a block diagram of a system that includes the ICS with a Form-Based User Interface ("FBUI"), under an embodiment.

FIG. 12-X is a sample FBUI as displayed on a client device, under an embodiment.

FIG. 13-X is a block diagram of a system that includes multiple sites and multiple components, under an alternative embodiment.

Figure 1:
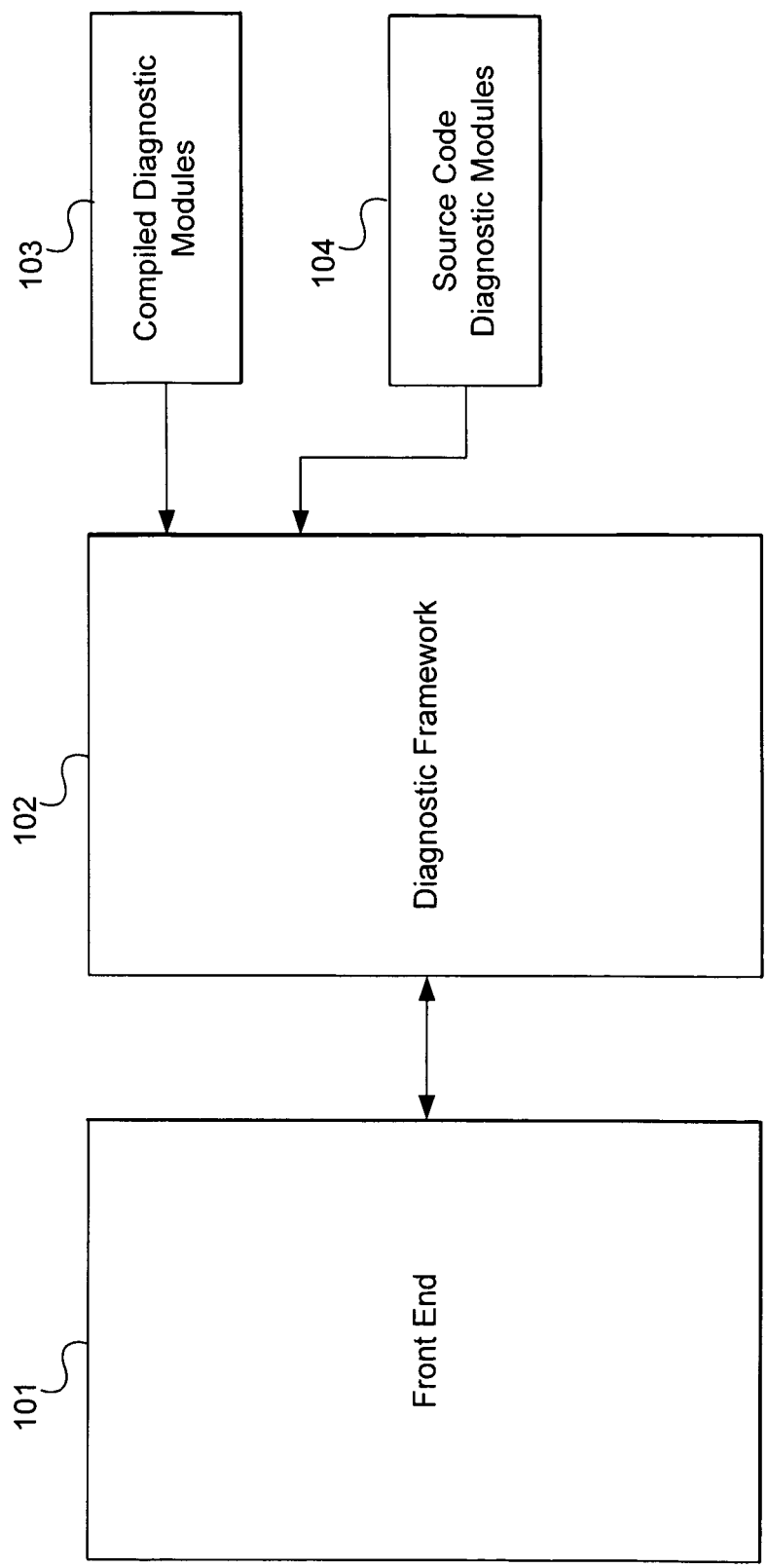
FIG. 1 is a block diagram of a diagnostic tool, according to an embodiment of the invention.

In the drawings, the same reference numbers identify identical or substantially similar elements or acts. To easily identify the discussion of any particular element or act, the most significant digit or digits in a reference number refer to the Figure number in which that element is first introduced (e.g., element 110 is first introduced and discussed with respect to FIG. 1-X).

DETAILED DESCRIPTION

An embodiment of the invention is directed to a diagnostic tool. The tool provides a framework for running diagnostics. The diagnostics may be for internal or external troubleshooting and resolution. The tool supports source code compilation to extend the suite of diagnostics in the field. In an embodiment of the invention, the tool has support for runtime configurable parameters to the diagnostic methods.

An embodiment of the tool supports source code compilation to compliment diagnostics that are precompiled before deployment. This allows field engineers, technical staff, or end users to enhance the suite of diagnostics. In addition, since the compiled source runs within the preexisting framework provided by the tool, the advantages of the framework can be available for the newly provided source code without needing to recreate a framework. This can provide advantages in capturing or otherwise recording the results of a diagnostic run. In an embodiment of the invention, when the newly provided source diagnostics are run within the preexisting framework, the framework automatically causes the output of the new diagnostics to be gathered and stored.

In an embodiment of the invention, the tool supports runtime configurable parameters. Over time, new diagnostic modules may be provided that require new parameters. These may be precompiled diagnostic modules or source code of diagnostic modules. The framework automatically recognizes the requirement for values for parameters in the new diagnostic modules, and the values for the new parameters are provided automatically at runtime.

FIG. 1 is a block diagram of a diagnostic tool, according to an embodiment of the invention. Shown in FIG. 1 are front end 101, diagnostic framework 102, compiled diagnostic modules 103 and source code diagnostic modules 104. Front end 101 is coupled to diagnostics framework 102. Compiled diagnostic modules 103 and source code modules 104 are coupled to diagnostic framework 102. Diagnostic framework 102 loads the diagnostic modules that perform diagnostics. According to an embodiment of the invention, diagnostic framework loads these modules in response to a request from front end 101. Front end 101 may comprise a user interface by which a user requests that certain diagnostic modules be run. For example, in one implementation front end 101 includes a user interface with pull down menus which provides a user a choice of various diagnostics that may be run. After the user selects the diagnostics to be run and request that they be run, front end 101 requests that diagnostic framework 102 run the respective diagnostics.

Diagnostic framework 102 loads the respective diagnostic modules from among compiled diagnostic modules 103 and source code diagnostic modules 104. Compiled diagnostic modules may be diagnostic modules that are provided along with the target system that is to be tested. Alternatively, the compiled diagnostic modules may be diagnostic modules that are provided in some other way, for example, as updates provided by the seller of the target system which is to be tested. Source code diagnostic modules 104 comprise uncompiled code for diagnostic modules. These may be written, for example, by an administrator of the target system that is to be diagnosed. Because diagnostic framework 102 can receive and use source code diagnostic modules 104, diagnostic framework 102 can use newly provided diagnostic modules without requiring diagnostic framework 102 to be rewritten.

After receiving compiled diagnostic modules 103 and source code diagnostic modules 104, diagnostic framework 102 compiles source code diagnostic modules 104 resulting in additional compiled diagnostic modules. These compiled diagnostic modules along with compiled diagnostic modules 103 comprise a set of diagnostic modules that may be run by diagnostic framework 102. Diagnostic module 102 runs diagnostic modules from among the set of diagnostic modules that can be run. According to an embodiment of the invention, diagnostic framework 102 runs a selected set of diagnostic modules based on instructions from front end 101. After running the respective diagnostic modules, diagnostic framework 102 gathers the results of the diagnostics. These results may be stored. Additionally or alternatively, these results may be automatically mailed to a service organization or the manufacturer of the target system on which the diagnostics were run.

Figure 2A:
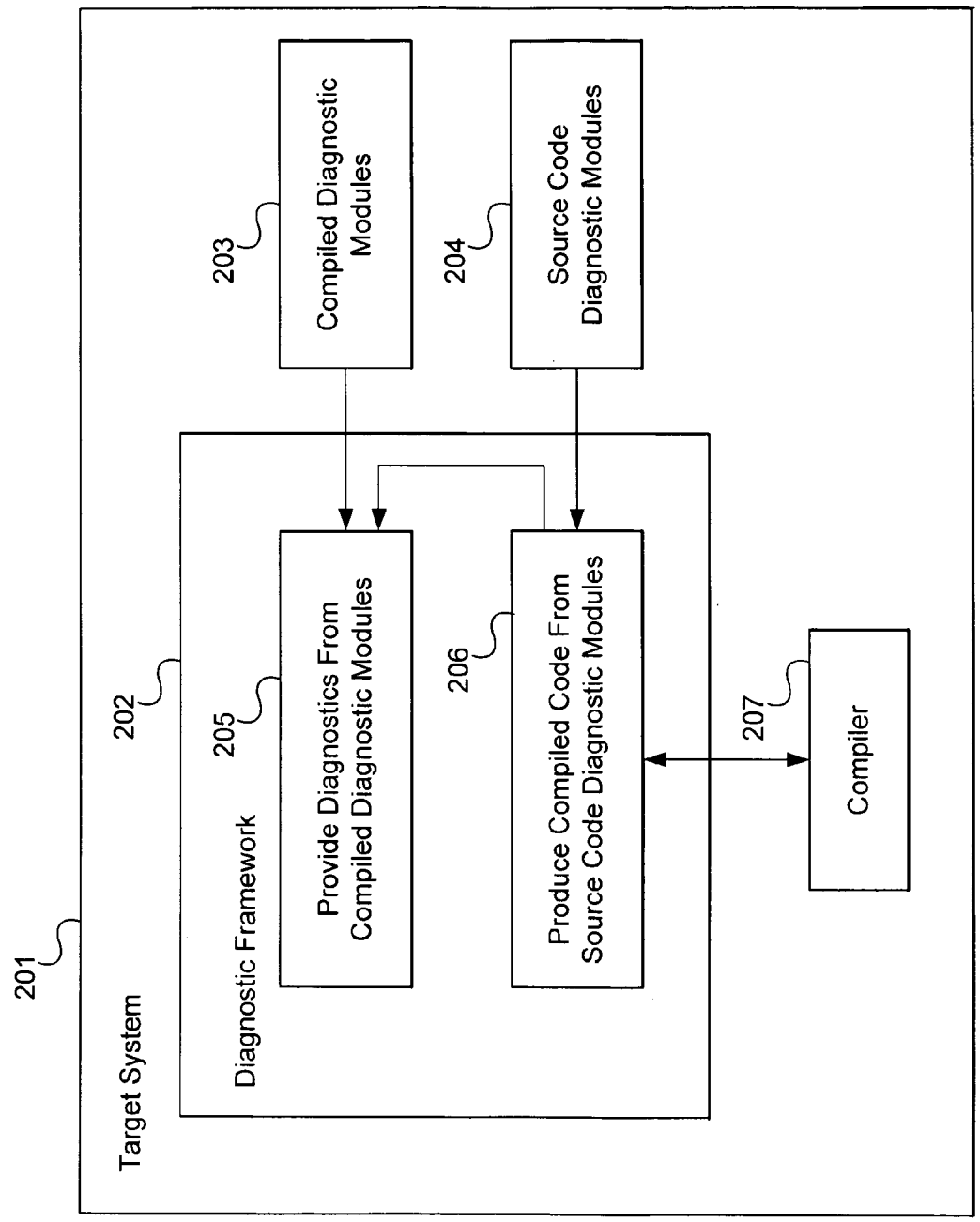
FIG. 2A is a block diagram of a target system with a diagnostic tool, according to an embodiment of the invention.

FIG. 2A is a block diagram of a target system with a diagnostic tool, according to an embodiment of the invention. Shown in FIG. 2A are target system 201 which includes diagnostic framework 202, compiler 207, compiled diagnostic modules 203 and source code diagnostic modules 204. Diagnostic framework 202 includes provide diagnostics from compiled diagnostic modules block 205 and produce compiled code from source code diagnostic modules 206. Produce compiled code from source code diagnostics modules block 206 is in communication with source code diagnostic modules 204, compiler 207 and provide diagnostics from compiled diagnostic modules 205. Provide diagnostics from compiled diagnostics module 205 is also in communication with compiled diagnostic modules 203.

Diagnostic framework 202 runs diagnostics on target system 201 that diagnose target system 201. The diagnostics that diagnostic framework 202 runs include diagnostics from compiled diagnostic modules 203 and from source code diagnostic modules 204. Produce compiled code from source code diagnostic modules block 206 causes compiler 207 to compile source code diagnostic modules 204. The resulting compiled diagnostic modules are provided to provide diagnostics from compiled diagnostic modules block 205. Diagnostic framework 202 then runs diagnostics that are provided from provide diagnostics from compiled diagnostic modules block 205. These diagnostics are run on target system 201 and may diagnose various aspects of target system 201.

Note that, according to an embodiment on the invention, compiled diagnostic modules 203 may be provided from outside of target system 201. For example, compiled diagnostic modules 203 may be provided over a computer network, such as over the internet or internal network. These compiled diagnostic modules 203 may be ultimately provided from a website or other source of updated diagnostic modules, for example, provided by the manufacturer of target system 201. Alternatively, compiled diagnostic modules 203 are created and/or stored on target system 201. Although not shown, additional functionality, such as a front end may be provided to cause diagnostic framework 202 to load the respective diagnostic modules and run them. The diagnostic modules may be found on target system 201 based on their respective extensions and/or based on being stored in a particular directory associated with diagnostic framework 202. For example, particular file extensions may be associated with source code diagnostic modules 204. In such a configuration, front end software finds diagnostic modules 204 based on these extensions and causes diagnostic framework 202 to compile and run the respective diagnostic modules.

Compiler 207 may be included within diagnostic framework 202, according to an embodiment of the invention. According to one embodiment of the invention, diagnostic framework 202 comprises assembly code in a .NET framework. Compiled diagnostic modules 203 may comprise assemblies in a .NET framework. Source code/diagnostic modules 204 may be source code that is compiled into assemblies for a NET framework. Compiler 207 may comprise a compiler available in a class library, such as a code dom (Document Object Model) compiler available in FCL (Framework Class Library) layer in a .NET framework configuration. The dom compiler is built into the framework of the FCL class library. Thus, the compiler 207 is provided in the FCL in a .NET framework in one implementation. According to an embodiment of the invention, compiler 207 is included within diagnostic framework 202. Compiler 207 may be linked with diagnostic framework 202 at runtime. According to an embodiment of the invention, the compiler that is included in diagnostic framework 202 is a code dom compiler provided from the FCL layer in a .NET framework.

Figure 2B:
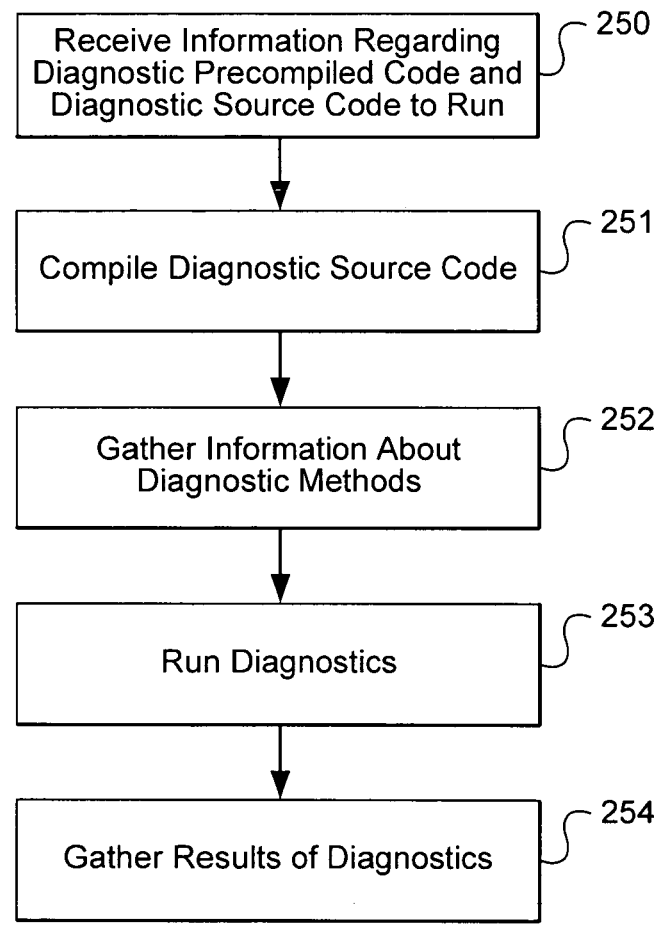
FIG. 2B is a flow diagram of a diagnostic tool, according to an embodiment of the invention.

FIG. 2B is a flow diagram of a diagnostic tool, according to an embodiment of the invention. The diagnostic tool uses diagnostic source code in order to provide diagnostics. The diagnostic source code allows an administrator or other user to extend the suite of diagnostics that may otherwise be available for troubleshooting and resolution. First, information regarding the diagnostic precompiled code and diagnostic source code which is to be run is received (block 250). For example, instructions may be received regarding which particular modules are to be run. According to an embodiment of the invention, the modules may include only precompiled diagnostic precompiled code, only diagnostic source code, or a combination of both diagnostic precompiled code and diagnostic source code.

The diagnostic source code is compiled (block 251). By compiling source code, the diagnostics that would otherwise be available to the diagnostic tool are extended. An administrator or other user is able to write source code and then this source code is available to be used as part of a collection of diagnostics.

Information is gathered regarding the diagnostic methods (block 252). According to an embodiment of the invention, this information is gathered about the diagnostic methods that are to be run. This gathering may take place through a reflection process. In reflection, information regarding all the diagnostic methods is gathered, such as, the names of the methods and the names of the respective parameters, according to an embodiment of the invention. This information gathered in the process of reflection is information stored in the metadata associated with the respective methods and parameters.

The diagnostics are run (block 253). Running the diagnostics may occur in response to instructions from a front end software or logic. The instructions may include particular instructions as to which diagnostics to run. According to an embodiment of the invention, if the appropriate information is not available to run certain diagnostics, such diagnostics are automatically not run. Results of the diagnostics are gathered (block 254). These results may then be stored, according to an embodiment of the invention, and may be made available to various recipients. For example, the information may be provided through a network to the manufacturer of the target system that is being diagnosed. According to another embodiment of the invention, the information is stored in a diagnostic run file. An administrator may then be able to review the diagnostic run file or otherwise analyze it in order to determine the results of the diagnostics that ran.

FIG. 3 is a relationship diagram of diagnostic assemblies, according to an embodiment of the invention. Shown in FIG. 3 are diagnostic assemblies 301, diagnostic assembly 302, diagnostic type 303, diagnostic method 304, diagnostic parameter 305 and source compiler 306. Diagnostic assemblies 301 symbolizes a collection of various diagnostic assemblies that are available, for example, diagnostic assemblies that are available to a framework that runs diagnostic assemblies. Thus, diagnostic assemblies 301 includes multiple instances of diagnostic assembly 302. Diagnostic assembly 302 is a collection of diagnostic type 303. Diagnostic type 303 is a collection of diagnostic method 304, and diagnostic method 304 is a collection of diagnostic parameter 305.

During a process of reflection, which may be carried out by a framework that runs diagnostics, information is gathered in a descending fashion from the various items shown starting with diagnostic assemblies 301. For example, diagnostic assemblies 301 is reflected upon to determine the associated diagnostic assembly such as diagnostic assembly 302. Diagnostic assembly 302 is reflected upon to determine the corresponding members of diagnostic type such as diagnostic type 303. Diagnostic type 303 is reflected upon to determine the corresponding members of diagnostic method such as diagnostic method 304, and diagnostic method 304 is reflected upon to determine the corresponding diagnostic parameters such as diagnostic parameter 305 that diagnostic method has associated with it.

Source code of diagnostic modules is provided as input to source compiler 306. The resulting compiled modules are also provided to the collection of diagnostic assemblies 301. As shown here, output of source compiler 306 is provided to diagnostic assembly 302. Thus, the collection of diagnostic assemblies 301 may include diagnostic assemblies that were provided as source code. Such source code may be provided to the diagnostic tool during run time according to an embodiment of the invention.

When there is a request to load specific diagnostic assemblies, such as when a framework responsible for loading the assemblies is required to do so, the collection of diagnostic assemblies is formed in a manner as shown in FIG. 3. A resulting hierarchy of diagnostics is then formed at starting time.

Figure 4A:
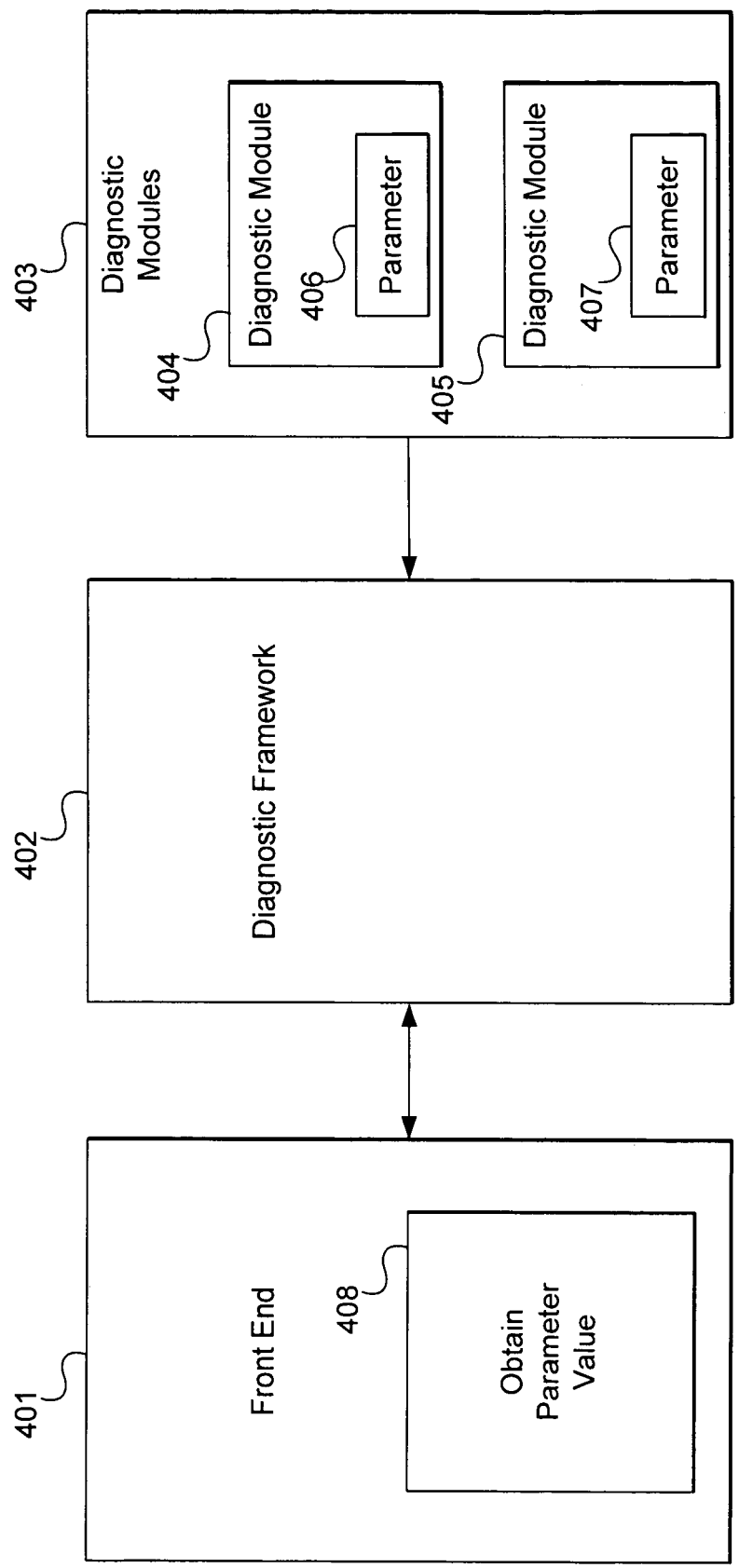
FIG. 4A is a block diagram of a diagnostic tool that uses methods with parameters, according to an embodiment of the invention.

FIG. 4A is a block diagram of a diagnostic tool that uses methods with parameters, according to an embodiment of the invention. In an embodiment of the invention, the tool supports run time configurable parameters. Over time, new diagnostic modules may be provided that require new parameters. The diagnostic framework software is able to handle these new diagnostic modules that have new parameters, even though particular parameters were not known to the diagnostic framework in advance. Thus, new diagnostic modules may be provided that receive values for new parameters, even though the existence of these parameters was not contemplated at the time of the creation of the diagnostic framework which loads and runs the respective diagnostic modules.

Included in FIG. 4A are front end 401, diagnostic framework 402 and diagnostic modules 403. Front end 401 is in communication with diagnostic framework 402. Diagnostic modules 403 are also in communication with diagnostic framework 402. Diagnostic framework 402 loads and runs diagnostic modules, which perform diagnostic functions. For example, diagnostic framework 402 may load diagnostic module 404 and diagnostic module 405. Front end 401 may cause diagnostic framework 402 to load and run respective diagnostic modules 403.

Diagnostic framework 402 gathers information about diagnostic modules 404 and 405. This information may include the names of the modules and their respective parameters. This gathering of information may take place through a process of reflection. Diagnostic framework may then make the existence and/or name of the parameters in the respective diagnostic modules available so that runtime values of these parameters may be provided. For example, diagnostic framework may gather information about diagnostic module 404 and diagnostic module 405 determining that these modules have parameter 406 and parameter 407, respectively. Then, diagnostic framework 402 may make information regarding the existence of parameters 406 and 407 available so the runtime values of parameter 406 and parameter 407 may be provided.

According to the embodiment of the invention, front end 401 queries diagnostic framework 402 for the names of the parameters. In this example, diagnostic framework 402 then provides the names of parameter 406 and parameter 407 to front end 401. A module such as obtain parameter value block 408 of front end 401 may obtain the values for these parameters. In one embodiment of the invention, front end 401 includes a user interface. The user interface may obtain the parameter value by requesting that a user, such as the system administrator, provide runtime values for these parameters. In alternative embodiments of the invention, front end 401 obtains the runtime values for the parameters in other ways. For example, front end 401 may receive the values of the parameters from a batch file. Front end 401, according to an embodiment of the invention, may be software that periodically runs automatically and causes diagnostic framework 402 to run. Obtain parameter value block 408 may also obtain parameter values automatically, according to an embodiment of the invention.

The parameter runtime values are obtained and provided to diagnostic framework 402, and diagnostic framework 402 receives these values and passes these runtime parameters values to the diagnostic modules. For example, a runtime value may be obtained for parameter 406 of diagnostic module 404 and for parameter 407 of diagnostic module 405. After running the respective diagnostic modules, for example diagnostic module 404 and diagnostic module 405, diagnostic framework 402 gathers the results of the diagnostics. These results may be stored, or provided in some other manner.

Figure 4B:
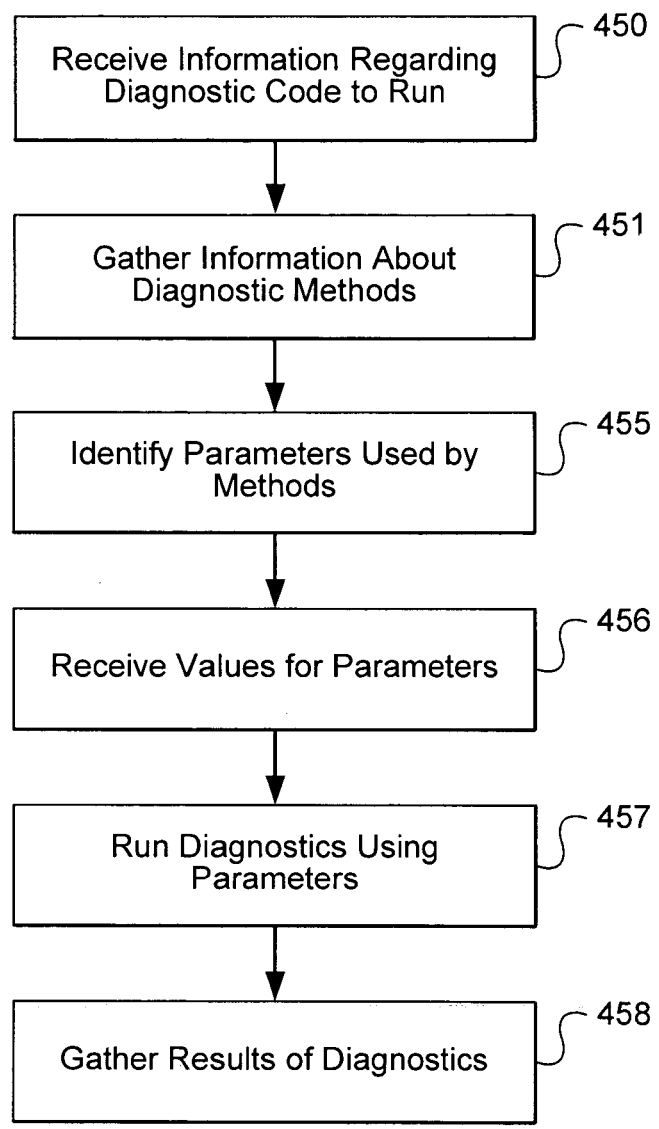
FIG. 4B is a flow diagram of a diagnostic tool that uses methods with parameters, according to an embodiment of the invention.

FIG. 4B is a flow diagram of a diagnostic tool that uses methods with parameters, according to an embodiment of the invention. Diagnostic methods that require values for parameters are run automatically. Even though the existence of the parameters may not be known in advance, the parameters are automatically recognized and provided with values so that the diagnostics requiring the values of these parameters may be run.

Accordingly, information is received regarding diagnostic code which will be run (block 450). For example, a list of diagnostic modules that will be run may be received. Information is being gathered regarding these diagnostic methods (block 451). This information may include the names of the methods, their respective types, and so on. These run time values may be received through a user interface, according to an embodiment of the invention. This information may be gathered through reflection, according to an embodiment of the invention. In reflection the metadata associated with the respective assemblies, types, methods and parameters is reflected upon in order to find the respective information. The information also includes the values for the parameters thus, the parameters used by the methods are identified (block 455) and the runtime values for the parameters are received (block 456). Using these parameters and their values, the diagnostics are run (block 457). Finally, the results of the diagnostics are gathered (block 458).

Figure 5:
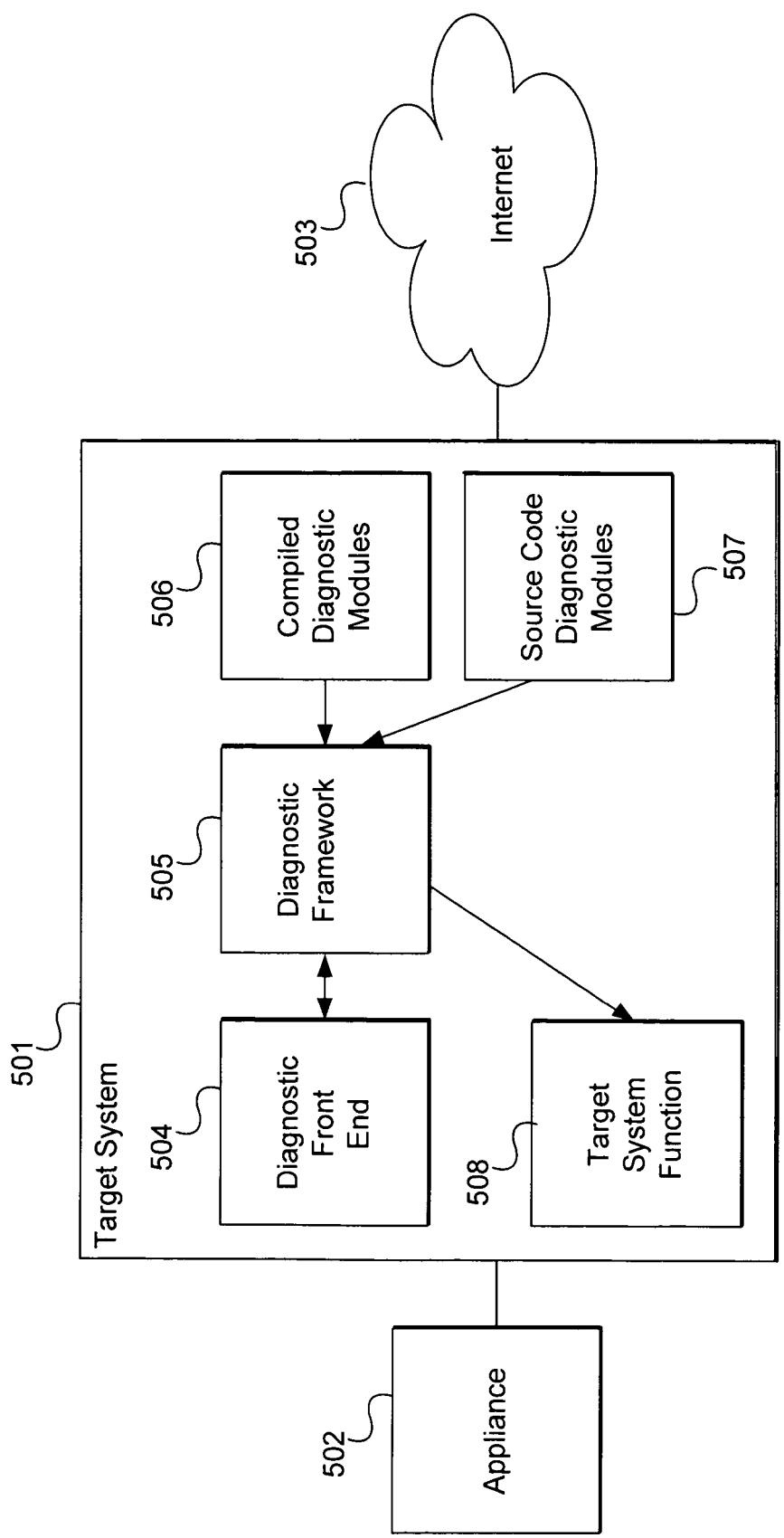
FIG. 5 is a block diagram of a diagnostic tool, according to an embodiment of the invention.

FIG. 5 is a block diagram of a diagnostic tool, according to an embodiment of the invention. The diagnostic tool shown in the target system may be included in a network environment with other technology. Shown are target system 501, appliance 502 and Internet 503. Target system 501 is coupled to appliance 502 and Internet 503. Target system 501 includes diagnostic framework 505, diagnostic front end 504, compiled diagnostic modules 506, source code diagnostic modules 507 and target system function 508. Diagnostic framework 505 is coupled with diagnostic front end 504. Diagnostic framework 505 is also in communication with compiled diagnostic modules 506 and source code diagnostic modules 507. Diagnostic framework 505 operates on target system function 508.

Diagnostic framework 505 receives diagnostic code that includes compiled diagnostic modules 506 and source code diagnostic modules 507. Diagnostic front end 504 causes diagnostic framework 505 to load respective diagnostics. These diagnostics include diagnostics from among compiled diagnostic modules 506 and source code diagnostics modules 507. Diagnostic framework 505 is able to compile or cause to be compiled source code diagnostic modules 507, such that these diagnostic modules can be run. The diagnostic modules are used to diagnose aspects of target system 501, such as target system function 508.

In an embodiment of the invention, target system 501 is a component of a communications system. For example, target system 501 may comprise a messaging and communications server such as a server that stores, forwards and otherwise processes email and other messages. Appliance 502 may also comprise an aspect of the communications system. For example, appliance 502 may comprise a voicemail appliance. In one example embodiment of the invention, appliance 502 comprises an appliance associated with voicemail system, and target system 501 comprises a communications server which provides storage and forwarding of voicemail messages and other functions, such as sorting and forwarding of email messages. Diagnostics may help to diagnose such a communications system. Internet 503 may provide the communication for various aspects of a target system. For example, in an example where target system 501 represents a part of a voicemail system, Internet 503 may be used to forward emails and/or voicemails to other systems.

In an example in which target system 501 represents a communication system, such as a voicemail system, diagnostic modules provided in compiled diagnostic modules 506 and/or source code diagnostic modules 507 may include one or various combinations of the following diagnostics:

- shared assembly versions. This diagnostic gathers version information about the installed target system assemblies (code).
- service account. This diagnostic checks to make sure the necessary target system service account information is present in the registry. An embodiment of this diagnostic also checks ability to impersonate this account, which tests the password for the account.
- registry paths. This diagnostic checks to ensure the path information for the target system software is correct in the registry.
- web sites. This diagnostic checks the target system web software installation for correctness.
- user extensions. This diagnostic checks to ensure the source configurable rules (for user extensions) are present and will compile.
- web service. This diagnostic checks to make sure the target system service account has proper permissions for the target system web service software to run.
- web application. This diagnostic checks to make sure the target system service account has proper permissions for the target system web application software to run.
- outlook extensions. This diagnostic checks to make sure the target system service account has proper permissions for the target system email system (e.g. outlook) extension software to run.
- identity key. This diagnostic checks whether the target system service account has proper permissions to access its identity key in the registry, which is used for proper operation of the software.
- greeting check. An embodiment of this diagnostic checks the ability to get and set a test user's recorded greetings. An embodiment of this diagnostic takes a test user email address as a parameter.
- pin code. This diagnostic checks to see if a pin code for a test user is correct. An embodiment of this diagnostic takes a test user email address and a pin code for parameters.

The following is a non-exhaustive description of various embodiments of systems in which embodiments of the diagnostic methods and systems described herein may be employed. For example, diagnostic methods and systems described herein may be employed in an interface module (IM) of an integrated multi-media communication system.

Integrated multi-media communication systems and methods are provided below. These communication systems and methods, collectively referred to herein as "integrated communication systems" or "ICS," integrate different types of messaging so that a user of the ICS can access multiple types of messages (e.g., voice mail messages, electronic mail, email messages, instant messaging messages, SMS (Short Messaging System) messages, MMS (Multimedia Messaging System) messages, etc. with a single message interface. In providing integrated messaging functionality via a single message interface, the ICS of an embodiment relieves the dependency of a voice mail system, for example, by providing users with access to voice mail messages and capabilities of the voice mail system through the local groupware applications and email messaging system.

The ICS generally includes a communication server, a cache system, and an interface module. The ICS integrates with a messaging and collaboration system and the corresponding groupware applications in a network environment for example. In providing integrated messaging capabilities, the communication server and interface module function to route a call received from a caller to a user and, in the event the user is not available, to receive and route a voice mail message left by the caller. The ICS uses caching processes during the receiving and routing of voice mail messages that provide users with fast access to voice mail messages, user information and contact information. Using caching process, the ICS also provides access to the voice mail messaging system during periods when the messaging and collaboration system is offline. The ICS also leverages the storage capability of the messaging and collaboration system to eliminate the need for a separate voice mail database.

The message interface of the ICS includes a form-based interface for use in retrieving voice mail messages and controlling actions taken on voice mail messages received in the enterprise network system. This form-based interface enables a user to retrieve and take various actions on voice mail messages using data of a form provided to the user's client device by the enterprise network email system. Use of the form-based interface thus provides users with access to the integrated messaging functions offered by the ICS without a requirement to install or run a dedicated client application on the user's client device.

In the following description, numerous specific details are introduced to provide a thorough understanding of, and enabling description for, embodiments of the ICS. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

FIG. 1-X is a block diagram of a system 10-X that includes an integrated communication system ("ICS") 100-X, under an embodiment. ICS 100-X includes a communication server 110-X, an interface module ("IM") 120-X, and a cache system 130-X (also referred to as the "cache"), but is not so limited. Communication server 110-X couples to components of any number of networks 150-X and 160-X using any of a variety of communication protocols, where networks 150-X and 160-X may be of the same or of different types. Networks 150-X and 160-X allow for information transfers between various client devices 170-X and 199-X, also referred to as user devices 170-X and 199-X.

IM 120-X of ICS 100-X couples to transfer information or data with communication server 110-X. Additionally, IM 120-X couples to transfer information with one or more components of a messaging server 140-X, where transferring information includes one or more of pulling, receiving, retrieving, polling, transmitting, and pushing operations, to name a few. As an example of an information transfer between IM 120-X and messaging server 140-X, IM 120-X pulls user information from messaging server 140-X and makes the pulled user information available to other components of ICS 100-X, wherein the user information includes information relevant to at least network 150-X.

The components of messaging server 140-X may include for example one or more processors 142-X, also referred to as "central processing units" or "CPUs," and one or more databases 144-X coupled to CPU 142-X. In an embodiment, IM 120-X may be hosted on or running under control of messaging server 140-X, but is not limited to this configuration. Further, messaging server 140-X may be a component of network 150-X that hosts communication server 110-X, but is not so limited. For example, messaging server 140-X may be hosting a groupware application (e.g., Microsoft Exchange, LotusNotes, etc.) of an enterprise network 150-X.

Cache 130-X couples to communication server 110-X and communicates to transfer information with one or more of communication server 110-X, IM 120-X, and one or more components of messaging server 140-X, as described below. Cache 130-X may also couple to additional components (not shown) of network 150-X.

As an example of information transfers between cache 130-X and communication server 110-X, cache 130-X may receive caller information (e.g., voice mail messages, caller identification, etc.) from client devices 199-X via communication server 110-X. An example of information transfers between cache 130-X and messaging server 140-X includes transfers in which cache 130-X receives user information from messaging server 140-X, where the user information may be routed from messaging server 140-X via IM 120-X and/or communication server 110-X. Another example of information transfers between cache 130-X and messaging server 140-X includes transfers in which messaging server 140-X receives information from cache 130-X routed from cache 130-X via communication server 110-X and/or IM 120-X.

Examples of information transfers between cache 130-X and IM 120-X include transfers of user information pulled from messaging server 140-X by IM 120-X and directed to cache 130-X, and transfers in which IM 120-X directs a message from at least one of messaging server 140-X and cache 130-X to at least one device on networks 150-X and 160-X using the user information. Cache 130-X holds or temporarily stores the received information under the above examples.

Networks 150-X and 160-X include various network components (not shown) of one or more communication service providers or carriers, but are not so limited. Further, networks 150-X and 160-X and corresponding network components can be any of a number/combination of network types known in the art for providing communications among coupled devices 170-X and 199-X including, but not limited to, proprietary networks, local area networks ("LANs"), metropolitan area networks ("MANs"), wide area networks ("WANs"), backend networks, public switched telephone networks ("PSTN"), the Internet, and other public networks for example. Additionally, networks 150-X and 160-X may include hybrid networks that use a proprietary network for some portion of the communications routing, for example, while using one or more different public networks for other portions of the communications routing.

Client devices 170-X and 199-X include communication devices like telephones, cellular telephones, and radio telephones. Client devices 170-X and 199-X also include processor-based devices like, for example, portable computers ("PC"), portable computing devices, personal digital assistants ("PDA"), communication devices, cellular telephones, portable telephones, portable communication devices, and user devices or units. Client devices can include so-called multi-modal devices, where the user can interact with the device and/or the ICS through any form of input and output, such as text input, speech recognition, text output, text-to-speech, graphics, recorded files and video. In such devices, the speech recognition and text-to-speech generation may partly take place in the device and partly in the ICS. Sound and/or video may be generated by the ICS by a continuous stream of sound and/or video data sent to the device. Client devices can include all such devices and equivalents, and are not limited to any particular type of communication and/or processor-based device. In an embodiment client devices 170-X are client devices operating in a private network environment like an enterprise network, while client devices 199-X are client devices operating in different private network environments or under any number of public networks.

FIG. 2-X is a flow diagram for providing integrated communication processes 200-X using ICS 100-X, under an embodiment. Processes 200-X include receiving data streams from networks of different types, at block 202-X. The data streams may include a variety of data including, for example, audio or voice data. Further, the data streams may be received from any number of networks or client devices operating on the networks. Processes 200-X further include generating messages at a communication server using information of the data streams, at block 204-X. The generated messages may be any of a number of message types. Returning to the above example in which the received data stream includes audio data, the generated message is a voice mail message, but is not so limited. Processes 200-X also include transferring the messages, at block 206-X. The transferring operation includes for example caching information of the messages in the ICS cache and/or forwarding the messages to a messaging server.

Continuing, processes 200-X include pulling user information from a messaging server coupled to the ICS, at block 208-X, as described above. The user information includes information relevant to users of at least the network hosting the ICS, but is not so limited. Processes 200-X also include caching pulled user information from the messaging server, at block 210-X. Additionally, processes 200-X include use of the user information of the cache to direct a message from at least one of the messaging server and the cache to one or more client devices on any of the networks, at block 212-X.

The ICS of an embodiment integrates different types of messaging so that a user of the ICS can access all of the message types (e.g., voice mail messages, electronic mail or email messages, etc.) with a single message interface (also referred to as a "user interface" or "UI"). In providing integrated messaging functionality via a single message interface, the ICS of an embodiment relieves the dependency on a voice mail system with a dedicated voicemail and user database, for example, by providing users with access to voice mail messages and capabilities of the voice mail system through the local email messaging system.

FIG. 3-X is a block diagram of example information flows 300-X in a system 30-X that includes ICS 100-X, under an embodiment. The system also includes a messaging server 140-X and any number of client devices 170-X that couple to ICS 100-X. In addition, ICS 100-X couples to a communications network 160-X. ICS 100-X, messaging server 140-X, and client devices 170-X may be hosted under a network 150-X, but are not so limited. System 30-X is shown with one each of ICS 100-X, messaging server 140-X, and client device 170-X for purposes of this description, but may include any number of each of ICS 100-X, messaging server 140-X, and client device 170-X coupled in any combination.

System 30-X may also couple to one or more other systems (not shown) or networks via any number of backend couplings (not shown)

Components of ICS 100-X include a communication server and an interface (not shown). The interface of ICS 100-X may run under control of messaging server 140-X, as described above, but is not so limited. Information flow 300-X begins when, in response to receiving data streams from networks 160-X of different types, ICS 100-X generates a first message 302-X and transfers first message 302-X to messaging server 140-X via a communication with messaging server 140-X. First message 302-X may be a voice mail message ("Voice Mail Type" or "VMT") but is not limited to this type of message. For purposes of the description herein, a voice mail message is left by a "caller" to the ICS. For example, in an embodiment where Microsoft Exchange is the messaging server 140-X, the VMT may be implemented using "Message Class" and/or "Message Type" fields associated with messages in Microsoft Exchange.

Following or simultaneous with receipt of first message 302-X, the messaging server 140-X detects or identifies a type of first message 302-X using information of the first message and generates a second message 312-X. Second message 312-X is of a different type from that of first message 302-X, and includes information of first message 302-X. Second message 312-X may for example be an email message but is not limited to this type of message. Second message 312-X is transferred to a client device 170-X via a communication with client device 170-X, where the communication uses a communication protocol of network 150-X.

Responsive to receipt of second message 312-X, client device 170-X determines a type of the second message and requests form data 314-X that corresponds to second message 312-X. Messaging server 140-X, in response to the request for form data 314-X, transfers form data 314-X to client device 170-X via the second coupling. One or more components of ICS 100-X generate and/or provide form data 314-X for storage in messaging server 140-X, and form data 314-X is generated under the communication infrastructure of network 150-X. The form data may be displayed to the user using the corresponding form.

Client device 170-X uses form data 314-X to view contents of second message 312-X. The client device also uses form data 314-X to establish communications with communication server 110-X (of ICS 100-X) via a third coupling. The communication protocol of the third coupling is different than the communication protocol of the second coupling, but is not so limited. An "embedded control" controls activation of the third coupling. Furthermore, the client device allows a "user" using the client device to direct actions 322-X on first message 302-X via the third coupling with the ICS using the form data. For purposes of the description herein, a "user" is an individual with enabled capability to use functions within the ICS.

As an example under information flows 300-X, FIG. 4-X is a flow diagram for integrated communication processes 400-X using ICS 100-X, under an embodiment. Processes 400-X include transferring a first message to a messaging server from a communication server via a first coupling, at block 402-X. Processes 400-X also include generating a second message at the messaging server in response to a type of the first message and transferring the second message to a client device via a second coupling, at block 404-X. The second message may be of a different type than the first message and includes data of the first message. Processes 400-X further include transferring to the client device form data that corresponds to the first message, at block 406-X. Additionally, processes 400-X include establishing a third coupling between the client device and the communication server using the form data, at block 408-X. Moreover, processes 400-X include directing actions on the first message from the client device using the form data, the actions directed via the third coupling, at block 410-X.

The ICS of an embodiment integrates messages of different types to enable a user to access a number of message types through components of the ICS. Thus, an application of the ICS of an embodiment is as a substitute for a voice mail system in an enterprise network, where the ICS enables a user to receive and/or take action on voice mail messages using the enterprise email system.

FIG. 5-X is a block diagram of an enterprise network system 500-X that includes a communication server 110-X and IM 120-X of an ICS, under an embodiment. Communication server 110-X couples to at least one messaging server 140-X via IM 120-X. IM 120-X runs under messaging server 140-X, but is not limited to running under this server. Messaging server also couples to one or more databases 144-X. Messaging server 140-X of an embodiment supports the messaging capabilities of enterprise network system 500-X using a groupware application (e.g., Microsoft Exchange) (not shown) along with other applications as appropriate to the size and type of enterprise network system 500-X. Messaging server 140-X, database 144-X, and groupware application (not shown) may be referred to as collectively forming a "messaging environment."

Communication server 110-X couples to any number of client devices 199-X external to enterprise network 500-X via one or more networks (not shown), as described above with reference to FIG. 1-X. Similarly, communication server 110-X couples to any number of client devices 170-X local to enterprise network 500-X.

Communication server 110-X includes an operating system 518-X as well as numerous components or subsystems. These components include but are not limited to one or more Voice Applications 512-X, an Execution Engine 514-X, and any number of Mobile Application Modules 516-X, as described below, or any other type of application module.

FIG. 6-X is a block diagram of an enterprise network system 600-X that includes an ICS, under an embodiment. The ICS includes a communication server 610-X as described above, also referred to as a "Messaging Communication Server" or "MCS." The MCS may be highly scalable. According to an embodiment of the invention, the MCS may be configured as a modular "appliance" that is essentially self-contained, and may be, for example, encased in a stackable, "pizza-box" style server. The ICS also includes IM 620-X (also referred to herein as the "IM") and a Management Console 660-X. The IM, which in one embodiment runs under control of a messaging server 640-X (also referred to herein as "MSERV 640-X" or "MSERV"), couples to components of the MCS, the MSERV, and a Database 644-X (also referred to herein as a "Database") in a number of sequences as described herein and as appropriate to enterprise network system 600-X. The IM also couples to MCS Management Console 660-X. The MCS and the MSERV couple to the LAN for communication with other components (not shown) of enterprise network system 600-X.

The MCS of an embodiment includes an "Operating System" along with an "Execution Engine," some number of "Voice Applications," and some number of "Mobile Applications." The Operating System includes for example a Linux kernel with a journaling file system that provides integrity of file system tables and the data structure. The storage on the MCS may be configured as a RAID (Redundant Array of Independent Disks) configuration to provide high reliability access to software and data. The Operating System supports operations of numerous other components of the MCS as described below.

With regard to the Operating System, the MCS includes a "Telephony Interface" that couples calls and connects callers and users to/from the MCS. The Telephony Interface couples call information to/from a private branch exchange ("PBX") (not shown) for example, where the PBX is a component of enterprise network system 600-X. The Telephony Interface couples to the PBX using a variety of telephony integrations that include one or more of analog, Simplified Message Desk Interface ("SMDI"), T1/E1, Voice over Internet Protocol ("VOIP"), and Digital Set Emulation ("DSE") signals, but may couple using other signals/signaling protocols. When receiving a call from the PBX, for example, the MCS receives data of an incoming call from the PBX, where the data includes called party information, a reason for transfer of call (e.g., called party line busy, no answer by called party, called party using call forwarding, etc.), and calling parting information (caller ID, etc.).

A "Driver" couples information received at the Telephony Interface to the "Telephony Services" component of the MCS. The Driver may perform low level signaling and/or data conversion as appropriate to the received signals. The Telephony Services include one or more components for use in processing the received signals. These components include, for example, voice processing, switching/control, and PBX signaling, but are not limited to these components.

The MCS of an embodiment includes at least one "Voice Browser" that, when the MCS receives a call, receives voice information of the call. The Voice Browser controls the use of automatic speech recognition ("ASR") for speech recognition and DTMF recognition. The Voice Browser of an embodiment couples to a cache or other temporary store that holds voice recordings and/or name grammars ("Voice Recordings/ Grammars") (the name grammars are cached after being generated from names in a user list, as described below). The ASR may use information of the name grammars. Further, the Voice Browser controls the use of text-to-speech ("TTS") as well as the play of any number of pre-recorded prompts (e.g., WAVE format files). The Voice Browser uses voice extensible markup language ("VXML") but is not limited to this protocol. Alternative embodiments of the MCS may not include the Voice Browser. As an alternative to a Voice Browser, the MCS may directly communicate with, or use other software or processes, for communication between the voice application and the Telephony Services and/or Driver.

The Virtual Machine, Voice Applications, and Execution Engine form a hierarchical state machine framework in which the Virtual Machine runs a number of APIs and modules. Consequently, the Voice Applications can include one component controlling the user interfaces ("UI") to the MCS, and another component handling lower-level communications with the modules. Use of a loose coupling between the modules and the Voice Browser provided by the state machine framework allows independence between the languages used in the different modules and the Voice Browser. The state machine framework may receive hypertext transport protocol ("HTTP") requests from the Voice Browser, for example, and generate VXML or Speech Application Language Tags ("SALT") (SALT extends existing mark-up languages such as hypertext markup language ("HTML"), extensible hypertext markup language ("XHTML"), and extensible markup language ("XML"), and enables multimodal and telephony-enabled access to information, applications, and web services from devices like PCs, telephones, and PDAs for example).

The Voice Applications of an embodiment include a number of components including an automatic attendant, a caller interface, a user interface, and a system main menu, but may include other types of voice applications. The automatic attendant is speech enabled, but may be dual tone multi-frequency ("DTMF")-enabled. The automatic attendant, which can be enabled or disabled, uses information of contact lists (e.g., User List) in the Cache.

The Voice Applications also include at least one voice mail application. The voice mail application uses information of the Cache (e.g., User List, Global Address List, Public Folders, Personal Contact Folders) in operations that include sending a new voice mail and/or forwarding a received voice mail. The voice mail application also uses Cache information in support of voice mail networking in which voice mails and corresponding information are exchanged with groupware applications of enterprise network system 600-X, as described below.

The voice mail application couples to the MCS state machine framework described above via one or more application programming interfaces ("API"). The APIs handle the different data formats/types in use by enterprise network system 600-X (e.g., greeting data, PIN (Personal Identification Number) code data, voice mail message data, system parameters, etc.). Similarly, the Cache also couples to the state machine framework, where the Cache includes one or more of local cache and distributed cache. Therefore, communications among the voice mail application, the Cache, and the MSERV take place via the state machine framework and the APIs as appropriate to the state (e.g., offline, online) of the MSERV.

In addition to the Voice Applications, the modules running under the Virtual Machine of an embodiment include Mobile Applications. The Mobile Applications provide access to user information via mobile devices, where the access may include transferring information of email, calendar, and/or contacts to a user's mobile client device via an electronic message (e.g., SMS, MMS, and/or pager).

The MCS also includes an "Administration/Configuration" manager. The Administration/Configuration manager provides access to and control of a unified configuration file of the MCS. The Administration/Configuration manager uses information of the unified configuration file to provide separate Configuration Files to one or more of the components of the MCS as appropriate. The unified configuration file can be copied from the MCS and stored for backup purposes. Additionally, a predefined configuration file may be uploaded to the MCS to provide the appropriate configuration for the MCS. A browser interface to the Administration/Configuration manager allows remote access to the MCS.

The MCS also includes a "Self Maintenance Supervisor" or reliability server that monitors MCS components and restarts failed processes when necessary, for example. In addition, the MCS also includes "Security Restrictions" for use in controlling MCS/port security.

As described above, the MCS of an embodiment interfaces with the MSERV via the IM. The MCS communicates with the IM via the Groupware Connector for example, but is not so limited. The Groupware Connector of an embodiment includes a "Web Server," but is not so limited. The MSERV functions as a messaging and collaboration server. The IM is an interface that runs under the MSERV in one embodiment to provide communications and information transfers between components of the MCS and components of the MSERV. In other embodiments, the IM may run under control of the MCS, for example. The IM includes and/or couples with Management Console 660-X as well as with a diagnostics component ("Diagnostics Component") and/or a run time component ("RTC") (not shown).

Management Console 660-X supports access to the MCS by a system administrator of enterprise network system 600-X for purposes of managing user access. Consequently, Management Console 660-X allows a system administrator to enable new users with integrated messaging functionality of the ICS and administer and monitor one or more MCSs.

The Diagnostics Component of the IM supports on-the-fly diagnostics gathering, computing, and/or compiling of pre-specified diagnostics information or parameters from the MSERV. In this manner the MCS may provide diagnostics information and a user may provide dynamically updateable diagnostics information.

The RTC translates communications between components of the MCS and components of the MSERV. As an example the RTC may be used to retrieve user information from the directory service (e.g., Active Directory) of a groupware application in response to a request from the MCS, as described below. Communications between the RTC and components of the MCS use for example XML and Web Services. Communications between the RTC and the MSERV may use one or more APIs of the MSERV (e.g., MAPI, Collaboration Data Objects ("CDO"), Web Distributed Authoring and Versioning ("WebDAV"), etc.).

The MSERV of an embodiment represents a messaging and collaboration server. The messaging and collaboration server includes a groupware application that runs on one or more servers and enables users via local client devices to send and/or receive electronic mail and other forms of interactive communication through computer networks. The MCS of an embodiment interoperates with groupware applications that include, but are not limited to, Microsoft Exchange Server, but alternative embodiments may use other types of messaging and collaboration servers. Therefore, the MCS of an embodiment interoperates with client device applications ("client applications") such as Microsoft Outlook, as well as with other email client applications (e.g., Microsoft Outlook Express).

The MSERV sends and receives email messages through what is commonly referred to as a client device such as a personal computer, workstation, or a mobile device including mobile phones or PDAs. The client device typically connects to the LAN, which may include any number and/or combination of servers or mainframe computers where the email mailboxes and public folders are stored. The centralized servers connect to numerous other types of networks (e.g., private or proprietary, and the Internet) to transmit and receive email messages to other email users. Consequently, the MCS uses the MSERV for storing and forwarding email messages in an embodiment.

The MSERV also couples to a directory service (not shown), which is a database of information on each user account in the enterprise network system. Access to the directory service may use for example a Lightweight Directory Access Protocol ("LDAP").

With regard to client device access functionality, the MSERV provides integrated collaborative messaging features such as scheduling, contact, and task management capabilities. As an example MSERV configuration, when the MSERV is Microsoft Exchange, the MSERV runs on a version of the Microsoft Windows Server operating system. A version of Microsoft Office Outlook runs on Windows-based local client devices and communicates with the MSERV through the messaging application programming interface ("MAPI") protocol. The MSERV also accommodates other client device access by supporting one or more of Post Office Protocol 3 ("POP3") and Internet Message Access Protocol 4 ("IMAP4") protocols as well as support for Simple Mail Transfer Protocol ("SMTP"). Using this same MSERV configuration example, the MCS of an embodiment, along with Microsoft Outlook Web Access (a service in Microsoft Exchange) accommodates web browser-based access clients, also referred to as thin clients.

The MSERV collaboration features support information sharing among users. Collaborative scenarios include maintaining shared address lists that all users can view and edit, scheduling meetings that include people and conference rooms by viewing associated free or busy schedules, the ability to grant other people, such as administrators, access to user mailboxes on behalf of the user.

As described above, the IM serves as an interface for the transfer of information between components of the MCS and components of the MSERV. Transferring information includes for example pulling, receiving, retrieving, polling, transmitting, and pushing operations, to name a few. As an example of information transfers between the MCS and the MSERV, the IM pulls information from one or more components of the MSERV and makes the pulled information available to, for example, the MCS Cache. The IM also pushes information from one or more components of the MCS to the MSERV.

In serving as an interface between the MCS and the MSERV, the components of the IM (e.g., RTC) translate communications between components of the MCS (e.g., Virtual Machine, Cache, etc.) and components of the MSERV environment. As an example the IM retrieves user information from components of the directory service (e.g., Active Directory) in response to a request from the MCS/Cache.

Embodiments of the IM may include one or more of the following components: an RTC, a Management Console, a desktop component, messaging actions control component, Diagnostics Component and/or a message waiting indication component. The desktop component allows the user to configure aspects of the user's integrated messaging account, such as voice message greetings, extended absence greeting, PIN code data, and presence information. The messaging actions control component receives and responds to user generated requests from the FBUI (defined herein) to take actions such as playing, replaying to and forwarding voice messages, as well as calling the sender of a voice mail message. The message waiting indication component receives events from the user's message inbox folder and requests corresponding action from the PBX or other aspect of the telephony system, such turning on message waiting indicators on the user's device(s). The message waiting indication component may send notifications by way of SMS, MMS and/or pager.

FIG. 7-X is a block diagram 700-X that shows interactions between the IM and components of the MSERV environment 740-X, under an embodiment. The components of MSERV environment 740-X include the MSERV and one or more Databases as described above. The Database of an embodiment includes a directory service 742-X.

Directory service 742-X provides a location for storage of information about network-based entities, such as applications, files, and printers to name a few. Directory service 742-X also stores information about individuals, also referred to as users, and this information is referred to herein as "User Information." As such directory service 742-X provides a consistent way to name, describe, locate, access, manage, and secure information about individual resources in an enterprise network environment. Directory service 742-X uses the stored information to act as the main switchboard of the enterprise network operating system and is therefore the central authority that manages the identities and brokers the relationships between distributed resources of the enterprise network, thus enabling the resources to work together. Directory service 742-X of an embodiment may be Microsoft Active Directory ("AD"), but is not so limited.

In embodiments including AD, there is a user object stored in an AD Database for each enterprise user. For example, the user object for enterprise USER 2-X is shown as USER 2-X object 702-X. The user object includes many fixed attributes such as user name, user phone number, user mailbox location, and user email address.

The user object further includes a number of "Custom Attributes." The number of Custom Attributes is small, for example fifteen, compared to the number of fixed attributes. The Custom Attributes are usable to store information not provided for in the predefined fixed attributes. In one embodiment, a Custom Attribute stores user-specific data that is used by the Voice Applications. Examples of such user-specific data include a class of service ("COS") for the user, a voice mail extension for the user, whether voice mail is enabled for the user, etc. The data is stored as a data stream in the Custom Attribute with a maximum size of 2048 bytes. In an alternative embodiment, the user-specific data that is used by the Voice Applications is stored as individual data items in fixed attributes by extending AD in a known manner.

The user mailbox location fixed attribute indicates where the user's email mailbox is stored in the enterprise. In some large enterprises, there may be many MSERVs, each including a database storing many user mailboxes. As shown, the mailbox location fixed attribute points to USER 2-X mailbox 704-X on an MSERV called MSERV 1-X.

User mailbox 704-X stores email messages sent to the user, as well as outgoing messages and other items, for predetermined periods of time. In an embodiment, the messages can be of at least two types, one of which is a "normal" message that is routinely accessible by the user. Another message type is a "hidden" message that is not routinely accessible by the user through the normal user email interfaces. In an embodiment, a hidden message is used to store data used by the Voice Applications. In contrast to the data stored in the Custom Attribute, however, the data stored in the hidden message can be much larger than the 2048 byte limit of the custom attribute. In one embodiment, among the data stored in the hidden message are audio files stored as attachments to the hidden message, such as a "busy" greeting for the user's voice mail mailbox, a "no answer" greeting for the user's voice mail mailbox, and a recorded name for the user's voice mail mailbox.

An example of the MCS accessing the MSERV environment 740-X through IM 620-X is a phone caller calling the voice mail mailbox of USER 2-X when USER 2-X is on the phone. The MCS transmits an action via IM 620-X with a request to "play busy greeting." The transmission includes information to access the USER 2-X object 702-X fixed attributes to determine the user's email mailbox location. In addition the transmission includes information to access the USER 2-X object 702-X Custom Attribute and to transfer the contents of the Custom Attribute to the MCS via IM 620-X. When the user's email mailbox is accessed, the hidden message is opened to transfer the appropriate audio file ("busy" greeting in this case) to the MCS for playing over the phone to the caller. In many cases, it may not be necessary to transfer either the Custom Attribute or the audio file from the MSERV environment 740-X because the current custom attributes and audio file are cached on the MCS.

As described above, operations of the Voice Applications and the Virtual Machine couple the Cache and other components of the MCS to components of the MSERV via the IM. As such, the MCS and the IM support the transfer of information between the Cache and backend network components like the MSERV and the database. This configuration provides transparency between the Voice Applications and data stored in the database when using information of the database to support voice mail messaging functions of the MCS, as described below.

The information transfers between the Cache and the MSERV along with use of the Custom Attributes and Hidden Messages as described above allow the ICS to overcome the need for an external database to store information stored by a typical voice mail system. This is because the information used by the MCS in providing voice mail message capabilities integrated with the email messaging capabilities of the enterprise network is pulled by the MCS from the MSERV via the IM. The pulling or retrieving may be performed periodically, continually, on demand, and/or in response to particular events (e.g., update of the information in the MSERV) but is not so limited. The information pulled by the MCS includes information of a "Global Address List" ("GAL"), information of one or more "Public Folders," "Personal Contacts," and information of a "User List."

The GAL includes information of all users in the enterprise network having access privileges that include the use of email. Public Folders include information of the network enterprise (e.g., contacts, calendars, etc.) that are shared with all users. The Personal Contacts include contact information for each user.

The User List includes User Information for a subset of users in the GAL each of whom has access privileged that include the use of the ICS. The User List therefore is a subset of the GAL and is retrieved and/or cached as a separate list or stream in order to improve efficiency of communications and minimize the delays associated with having the MCS search the entire contents of the GAL for information used in executing a user-requested action on a voice mail message. The User List of an embodiment includes one or more of the following parameters corresponding to each user, but is not limited to these parameters: Site identification, mail box number, pronounceable name, office telephone extension, COS, automatic attendant state (e.g., enabled, disabled), voice mail state (e.g., enabled, disabled), Voice User Interface ("VUI") state (e.g., enabled, disabled), mobile access state (e.g., enabled, disabled), bad logins, locked out, attendant destination, force change of PIN code, mobile gateway identification, full name, first name, last name, user name, home telephone number, office telephone number, cellular telephone number, identification, email address, department, active greeting state, time and date announcement, voice mail notification state (e.g., enabled, disabled), mail box status, PIN code in encrypted or raw form, no answer greeting, busy greeting, extended absence greeting, recorded name, and system greeting.

Instead of storing the information pulled from the MSERV in a separate voice mail database as would be done in a typical voice mail system, the pulled information is pushed by the IM to the MCS and held in the Cache. The MCS uses the pulled information in subsequent voice mail message manipulation operations as described below. This pulling and caching of information by the MCS improves the speed and efficiency of voice mail message operations and prevents unnecessary loads on the MSERV resulting from the nearly continuous stream of read requests to the MSERV database in typical messaging systems.

The pulling of information from the MSERV by the MCS includes pulling and caching of information including the GAL, Public Folder, and User List. The pulled information is cached by the MCS on a system or non-individual basis because this information applies throughout the enterprise. This information is pulled and cached periodically, for example at 24-hour intervals (e.g., each morning at 2:00 am), or may be loaded on demand, but is not so limited.

In contrast the MCS pulls and caches information of the Personal Contacts on a per user basis because this information is different for each user. The Personal Contacts may be requested and cached by the MCS periodically or on demand (e.g., at the time a user logs in to the ICS, in response to modifications of the Personal Contacts, etc.).

In operating to provide integrated messaging capabilities, the MCS and the IM function to route a call placed by a caller to a user and, in the event the user is not available, to receive and route a voice mail message left by the caller. The MCS and the IM also function to provide a user with access to voice mail messages using the messaging server of the enterprise email system. The voice mail access supports both online and offline modes of the messaging server.

An example of call routing by the MCS, and with further reference to FIG. 6-X, the MCS receives and detects a call at the Telephony Interface. Data of the call (e.g., called party information, calling party information, reason for call transfer, etc.) invokes the Voice Browser. The Voice Browser transfers a request to the Voice Applications in response to the call data.

A Dispatcher component of the Voice Applications routes the call to one or more other Voice Application components in accordance with information of the User List. As an example, the Dispatcher identifies the target user for the call, and determines whether the target user's automatic attendant is enabled. If the automatic attendant is enabled then the automatic attendant receives the call request and provides the caller with one or more call routing options (e.g., caller selects call routing by selecting and/or saying extension number, selecting and/or saying name, etc.) and routes the call according to the caller's input.

As an example, one or more of the Voice Applications determine an active greeting currently designated by the user for use in responding to calls (e.g., system greeting, no answer greeting, busy greeting, extended absence greeting, etc.), and retrieve the designated active greeting from one of the Cache or MSERV as appropriate to a state of the MSERV. The respective application(s) play the greeting, activate a "record mode" to record the voice mail message of the caller, and provide the caller with additional options available for call and/or message routing (e.g., message marking options, message delivery options, send message, route message to additional users, etc.). Upon completion of the recording and/or selection of a message routing option by the caller, the respective application(s) terminate the call (hangs up) and transfer the recorded voice mail message to one or more locations in the Cache and/or MSERV (e.g., a mail box) that correspond to the user, as described below with reference to FIGS. 8-X, 9-X, and 10-X. Alternatively, the voice mail message may be transferred before the application terminates the call.

As referenced above, the MCS of an embodiment in conjunction with the IM supports availability of and access to the voice mail applications when the MSERV is both "online" and "offline" through the use of the Cache. The MCS of an embodiment includes an "Offline Detector" that monitors an availability state of the MSERV and detects unavailability ("offline condition" or "offline state") of the MSERV. Upon detecting MSERV unavailability, the MCS transitions to a mode that supports voice mail message recording and retrieval during the MSERV offline condition.

Caching of select information received and/or generated in the MCS, including User Information and voice mail information, enhances performance of the enterprise network voice messaging system by reducing the instances of data retrieval from the MSERV. Further, caching of select information improves the reliability of the enterprise network voice messaging system by allowing access to the voice messaging system during periods when the MSERV is offline.

Information received at the MCS is routed and held in the Cache in accordance with policies running in the state machine framework and/or the availability state of the MSERV. Examples of information held in the Cache include but are not limited to the User List, Global Address List, information of Public Folders, information of Personal Contact Folders, voice mail message information (both the text description portion and the audio message portion of the voice mail message), greetings, and other user parameters/permissions, and personal information of users (e.g., PIN codes).

Regarding actions taken by the MCS following receiving and recording of a voice mail message when the MSERV is online, the MCS generally holds information of the recorded message in the Cache. The MCS may also transfer the recorded voice mail message via the IM to the MSERV where it is stored in the Database.

As an example, FIG. 8-X is an information flow 800-X for routing and accessing voice mail messages via the ICS when the MSERV is in an online state, under an embodiment. This information flow 800-X shows one MCS and one MSERV in an enterprise network environment, but this is shown only as an example and does not limit the network environment to the types, numbers, and/or coupling of components shown as alternative embodiments may have any number of MCSs and/or MSERVs.

Information flow 800-X begins when a caller places a call 802-X to a user and availability of the user results in the caller leaving a voice mail message (referred to herein as the "VMSG") for the user. The voice mail message VMSG is received at the MCS and routed 804C-X to the Cache where it is assigned an identification (referred to herein as the "CACHEID") and held. The voice mail message VMSG may be held in the Cache for a pre-specified period of time, but the embodiment is not so limited. The voice mail message VMSG and the CACHEID are also routed 804M-X to the MSERV via the IM, as described above. The MSERV assigns an identification (referred to herein as the "VMSGID") to the incoming voice mail message VMSG and stores 806-X the voice mail message VMSG along with the VMSGID and CACHEID in one or more areas of memory (not shown) available to the MSERV. Memory may include any various form of storage or computer-readable memories such as, but not limited to, volatile memory (random access memory ("RAM"), non-volatile memory (read-only memory ("ROM"), EEPROM, disk, and/or other storage devices that may include one or more of magnetic and optical storage media.

As described above, the MCS pulls information (e.g., periodically, on demand, etc.) from the MSERV via the IM and uses the pulled information in providing voice mail message capabilities integrated with email messaging capabilities of the enterprise network. Therefore, pulling operations by the IM include pulling of information identifying the stored voice mail message VMSG, where the information identifying the voice mail message VMSG includes but is not limited to the CACHEID. Upon request from the MCS, the IM may pull 808-X a voice mail list (referred to herein as a "VMLIST" 809-X), which includes CACHEIDs and VMSGIDs for any stored messages from the MSERV environment. The IM pushes 810-X VMLIST 809-X to the MCS where it is held. VMLIST 809-X may be generated from the user's inbox upon each request from the IM or may be stored and maintained in the MSERV or in the cache as a current representation of the contents of a user's voice mailbox, or inbox. If and when a time period for holding a VMSG in the Cache expires, the VMSG is still identifiable from VMLIST 809-X, and can be found in the MSERV if requested, using the VMSGID.

Information flow 800-X continues when a user accesses 820-X the enterprise network system to retrieve his/her voice mail messages. In an embodiment, the user access 820-X causes the VMLIST to be pulled 808-X from the MSERV and pushed 810-X by the IM to the Cache, and also or alternatively to the MCS Upon being provided with access to the MCS, the user selects one or many voice mail message(s) by selecting a VMSGID/CACHEID item from the VMLIST. In response to the user selection, MCS searches 822-X the Cache for a message, using the Cache identification CACHEID of the selected message. In a scenario in which the message was left by the caller and the time period for holding the message VMSG in the Cache has not expired, the MCS will locate the CACHEID and the message contents VMSG in the Cache. Once located through use of the CACHEID, the MCS retrieves 814R-X the voice mail message contents VMSG from the Cache, and plays the voice mail message for the user as appropriate to the action selected by the user.

In this manner the MCS provides user access to the contents of the voice mail message VMSG via a mapping and without storing voice mail message contents in the MCS. The mapping includes a mapping of voice mail message contents to identification information of the email environment (MSERV environment), and mapping identification information of the email environment to identification information of the voice mail environment (MCS). In this embodiment, therefore, the mapping includes mapping of voice mail message contents to the message identification VMSGID, and mapping of the message identification VMSGID of the email environment to the MCS identification CACHEID.

As used herein "pushing" data or information indicates an action of a component or entity that has the affect of transferring the data or information to another component or entity. Transferring includes sending in response to a request, query or command, and sending on the initiative of the transferring component or entity. The transfer may be an internetwork transfer, an intranetwork transfer, or a transfer between a network component or entity and a non-network component or entity.

As used herein "pulling" data or information indicates a component or entity receiving transferred data or information. Receiving includes receiving in response to a request, query or command, and retrieving in response to a request, query or command. The transfer may be an inter-network transfer, an intra-network transfer, or a transfer between a network component or entity and a non-network component or entity.

FIG. 9-X is an alternative information flow 900-X for routing and accessing voice mail messages via the ICS when the MSERV is in an online state, under an embodiment. This alternative information flow 900-X describes the scenario in which the message VMSG is left by the caller and stored in the cache and in the MSERV environment, and after expiration of the time for holding the message VMSG in the cache.

Information flow 900-X begins when a caller places a call 802-X to a user and availability of the user results in the caller leaving a voice mail message VMSG for the user. The voice mail message VMSG is received at the MCS and routed 804C-X to the cache as described above, and the VMSG and CACHEID is routed 804-X to the MSERV via the IM, also as described above. The MSERV assigns identification VMSGID to the incoming voice mail message VMSG and stores 806-X the voice mail message VMSG along with the VMSGID in one or more areas of memory (not shown) available to the MSERV.

Information flow 900-X continues when a user accesses 820-X the enterprise network system to retrieve his/her voice mail messages. VMLIST 809-X is pulled 808-X from the MSERV and pushed 810-X by the IM to the MCS. Upon being provided with access to the MCS, the user selects a voice mail message from VMLIST 809-X, by selecting a CACHEID/VMSGID item. The MCS searches 822-X the Cache for the Cache identification CACHEID of the selected message in response to the user selection. Because the message was left by the caller and stored in the MSERV environment and expired in the cache before the user calls in, the MCS will not locate the CACHEID in the Cache. Consequently, the MCS accesses the MSERV, identifies the message VMSG, and pulls 924R-X the voice mail message contents from the MSERV environment via the IM. The MCS plays the pulled voice mail message VMSG for the user as appropriate to the action selected by the user.

In addition to the online scenarios described above, the MCS of an embodiment provides offline behavior that allows for holding, storing, and retrieving voice mail messages when the MSERV is offline or unavailable for some reason, or during times when the connection between the MCS and the MSERV is unreliable. Offline behavior means absence of a coupling between the MSERV and the MCS. Regarding actions taken by the MCS following recording of a voice mail message when the MSERV is offline, a component of the MCS (e.g., Offline Detector) detects the MSERV is offline. The MCS holds the recorded voice mail message in the in response to detecting the MSERV state as offline. At such time as the MCS detects the MSERV is online, the Groupware Connector pulls the voice mail message from the Cache and transfers the recorded voice mail message via the IM to the MSERV where it is stored in the Database.

As an example, FIG. 10-X is an information flow 1000-X for routing and accessing voice mail messages via the ICS when the MSERV is in an offline state, under an embodiment. This information flow 1000-X shows one MCS and one MSERV in an enterprise network environment, but this is shown only as an example and does not limit the network environment to these components as alternative embodiments may have any number of MCSs and/or MSERVs.

The information flow 1000-X begins when a caller places a call 802-X to a user and availability of the user results in the caller leaving a voice mail message VMSG for the user. The voice mail message VMSG is received at the MCS, however a component of the MCS detects an unavailable or offline condition of the MSERV. In response to detecting the offline condition, the MCS assigns a CACHEID to the incoming message VMSG, and holds 1004C-X the message contents VMSG along with the CACHEID in the Cache.

Information flow 1000-X continues when a user accesses 820-X the enterprise network system to retrieve his/her voice mail messages while the MSERV remains in an offline condition. Upon being provided with access to the MCS, the user selects a voice mail message from a list of CACHEIDs generated from the collection of voice mail messages held for him/her by in the cache. In response to the user selection, the MCS searches 1022-X the Cache using the Cache identification CACHEID of the selected message. Upon locating the voice mail message by its CACHEID in the Cache, the MCS pulls 1014R-X the voice mail message contents from the Cache, and plays the voice mail message for the user as appropriate to the action selected by the user.

The MCS continues to monitor the condition of the MSERV. At such time as the MCS detects a return of the MSERV to an online condition, the MCS pulls 1004P-X the voice mail message VMSG and its CACHEID from the Cache, and transfers 1004M-X the voice mail message and CACHEID via the IM to the MSERV. The MSERV assigns an identification VMSGID to the incoming voice mail message VMSG and stores 1006-X the voice mail message VMSG along with the VMSGID and CACHEID in one or more areas of memory as described above.

In addition to the capabilities described above, the ICS of an embodiment provides a Form-Based User Interface ("FBUI"). The FBUI is a form-based messaging or communication interface for use by users in retrieving voice mail messages and controlling actions taken on voice mail messages received in the enterprise network system. This FBUI enables a user to retrieve and take various actions on voice mail messages using data of a form (referred to herein as the "FBUI FORM") that is presented to the user's client device by the enterprise network email system. Use of the FBUI Form thus provides the user with access to the integrated messaging functions offered by the ICS without a requirement to install or run a dedicated client application on the user's client device.

FIG. 11-X is a block diagram of a system 11-X that includes ICS 1100-X with FBUI 1180-X, under an embodiment. System 11-X includes an enterprise network 1101-X that provides integrated voice mail and email messaging through the use of ICS 1100-X. Enterprise network 1101-X includes a LAN that couples to components of ICS 1100-X and a messaging server environment 1140-X. ICS 1100-X includes MCS 1110-X IM 1120-X, and FBUI 1180-X, but is not so limited. FBUI 1180-X is presented to a user (e.g., USER Z) via one or more local devices like PCs or other processor-based devices.

Messaging server environment 1140-X includes the MSERV and a Database 1144-X, but is not so limited. The LAN couples to any number of other networks 1150-X and 1160-X using any of a variety of communication protocols, where the networks 1150-X and 1160-X may be of the same or of different types. As an example, the networks may include a public communications network 1150-X and a private communications network 1160-X. Private communications network 11160-X may be a PBX coupled to the LAN of the enterprise network, for example. Networks 1150-X and 1160-X allow for information transfers between client devices 11170-X that are local to enterprise network 1101-X and client devices 1199-X that are external to enterprise network 1101-X. The client devices may alternatively be referred to as "user device" 1170-X and 1199-X.

ICS 1100-X replaces the voice mail server typically found in enterprise networks with at least one MCS 1110-X. MCS 1110-X is coupled to the private communications network (e.g., PBX) of each network enterprise. While one MCS is shown in this example system 11-X, the enterprise network may include multiple MCSs 1110-X coupled to enterprise network in an "N+1" configuration, where "N" is any number 1, 2 ... X.

For security reasons, communication to and from the MCS is restricted in an embodiment. The MCS communicates with the IM servers, the private communications network, other MCSs and selected client devices. According to an embodiment of the invention, communications with the MCS may be restricted to network components having particular known addresses. Additionally or alternatively, communications with the MCS may require authentication by passcode or other security measures for certain kinds of access, for example, for access by the administrator. Security may also or alternatively be encrypted and/or provided by requiring a physical connection between the MCS and other component, such as in the case of a connection between an MCS and a private communications network through a direct cable connection.

The MCS via the FBUI generally provides a form to a client device from a first server (e.g., messaging server, MSERV, etc.) via a network connection. The form includes data or code that when executed by the receiving client device results in presentation of a FBUI on a display of the client device. The FBUI includes a number of buttons or icons that allow a user to select an action on an item via a second server (e.g., communication server, MCS, etc.), where the item is stored on the first and/or second servers, and the first and second servers are different servers. The FBUI of an embodiment uses a web browser embedded in the form as the means for coupling and/or communicating with a corresponding browser control of the second server. Communications between the client device and the second server thus avoid security and/or other network policy issues that would prohibit the client device from communicating with the second server via the network coupling between the client device and the first server.

As described above, the FBUI operates as a form-based messaging interface to transfer a first message (e.g., voice mail message) to a messaging server (e.g., MSERV) from a communication server (e.g., MCS) via a first coupling (e.g., IM). The messaging server generates a second message (e.g., email message) in response to a type of the first message and transfers the second message to a client device via a second coupling (e.g., LAN). The type of the first message is specified by the communication server using properties on the message that identify the message as a "Voice Mail Type" ("VMT") message. The second message is of a different type and includes data of the first message, but is not so limited. The communication server also transfers to the client device form data that corresponds to the first message. The client device uses the form data to establish a third coupling (e.g., browser link) between the client device and the communication server. The user may direct actions on the first message from the client device via the third coupling using the form data.

The ICS of an embodiment provides the FBUI 1180-X to a user via his/her local client device. The FBUI is provided to the client device through the use of a FBUI Form, where the structure of the FBUI Form conforms to the message structure of the messaging server environment. For example, when the messaging server environment includes the use of Microsoft Exchange and Microsoft Outlook, the FBUI Form is generated to comply with Microsoft formats as appropriate to Exchange and Outlook Information for generation of the FBUI Form is provided to the messaging server environment by the MCS via the IM, and the code used for FBUI Form generation is hosted by the MSERV in an embodiment. The FBUI Form of an embodiment includes code that generates information of the FBUI display as well as the buttons of the display. The FBUI Form further includes an embedded browser control for use in establishing communications between the client device displaying the FBUI Form and a web server (e.g., MCS, IM, other server) for example. The embedded browser control therefore allows the host client device to couple and communicate with a server that is different from the MSERV via a communication channel that is outside the enterprise network LAN. Thus, the FBUI Form enables a communication channel between the local client device currently executing the form and a component like the MCS and/or IM in spite of network policy issues that otherwise might prohibit the client device from communicating outside the enterprise network message infrastructure.

Using the FBUI, a user can access/view and take a variety of actions on his/her voice mail messages within an email framework of the host enterprise network system. As an example, when the MCS of an embodiment receives a voice mail message it transfers the voice mail message to the MSERV, as described above. In transferring the voice mail message to the MSERV, the MCS specifies properties on the message that identify the message as a "Voice Mail Type" ("VMT") message. The message is received and stored by the MSERV as a VMT message using the same storage and retrieval structure as used with other message types like email messages.

At such time as a user wishes to access his/her messages via his/her client device, the active message browser of the client device receives the VMT message along with any other mail messages currently stored in his/her electronic mail box. The message browser corresponds to the message structure of the messaging server environment (e.g., Outlook in a Microsoft environment). Upon receipt of the message, the message browser identifies the message as a VMT message. As the code that implements the FBUI Form is stored on the MSERV, implementation of the functionality and/or features associated with the FBUI Form uses communication between the user's client device and the MSERV via the LAN. For example, the client device message browser requests the FBUI Form from the MSERV in response to identifying a message as a VMT message because this is the form that corresponds to the VMT message type. The MSERV transfers the FBUI Form to the requesting client device, and the client device message browser launches the form in response to the user selecting a VMT message for viewing.

The message browser uses data or code of the FBUI Form to display the FBUI on the user's client device. FIG. 12-X is a sample FBUI 1200-X as displayed on a client device, under an embodiment. The FBUI 1200-X includes three areas 1202-X-1206-X that present information to a user. The areas include a folder area 1202-X, a contents area 1204-X, and a function area 1206-X, but are not limited to these areas as the UIs of alternative embodiments may present any number and/or type of areas. In alternative embodiments, all three areas 1202-X-1206-X may be presented at the same time, as shown in FBUI 1200-X, or various subsets of the three areas may be presented at the same time in various combinations.

Folder area 1202-X presents one or more folders to which the user has access via the FBUI 1200-X and the client device. The "INBOX" may contain a list of voice mail messages in the same listing as other messages, including email messages. Alternatively, the Inbox may include a subfolder ("VOICE MESSAGES") which includes the voice mail messages, and selection of this folder results in the presentation of voice mail messages of the user's mail box in the contents area 1204-X.

The contents area 1204-X generally presents the contents of the folder selected using the folder area 1202-X. As an example, the contents area 1204-X presents information corresponding to any number of voice mail messages in the user's mail box when the INBOX or VOICE MESSAGES folder is selected. Contents area 1204-X allows the user to select a particular voice mail message by placing a cursor on "VOICE MESSAGE 1 INFORMATION" for example. By (double) clicking a message in the contents area 1204-X or otherwise indicating to the message browser to display a voice message, a new window (referred to as the "ICS Window") is displayed. The ICS Window now includes function are 1206-X.

Function area 1206-X of FBUI 1200-X presents one or more "voice mail action buttons" 1206A-X-1206E-X (also referred to herein as "buttons") each of which represents an action the user may select for a voice mail message. In this example, the VOICE MESSAGES folder is selected, and selection of a message in contents area 1204-X allows the user to take an action on the selected message using buttons 1206A-X-1206E-X. Placing the cursor of contents area 1204-X on a particular message and choosing an action on the selected message with a button 1206A-X-1206E-X therefore invokes operations on the message via components of the ICS (e.g., MCS, Cache, IM). The buttons 1206A-X-1206E-X of an embodiment include a "Play on Phone" button 1206A-X, a "Play on Computer" button 1206B-X, a "Call Sender" button 1206C-X, a "Reply by Voicemail" button 1206D-X, and a "Forward by Voicemail" button 1206E-X, but the embodiment is not limited to this same number of buttons or to buttons offering the same functionality.

In other embodiments, presentation of areas or information of the FBUI may vary in many ways. For example, in one embodiment, the action buttons 1206-X appear after the user has selected (for example by double clicking a particular voice message from the contents area 1204-X. Action buttons 1206-X may also appear when the user right clicks on a particular voice message in the contents area 1204-X.

The folder area 1202-X may also include a subfolder ("VOICE MESSAGE SYSTEM") under the Public Folder. As such, the VOICE MESSAGE SYSTEM folder may not be considered an actual folder but instead a uniform resource locator ("URL") that, when selected, sends an HTTP request to a web server and launches/displays an ICS browser inside the client device message browser. The web server may, for example, be a component of the MCS and/or IM, but is not so limited. The ICS browser is an embedded or hidden browser that displays the ICS Window in the area of the client device message browser where emails would typically appear, and the voice mail messages are displayed in the ICS Window.

As an example, the ICS Window is displayed in the contents area 1204-X of an embodiment. The ICS Window may be served from the IM and may contain any information related to the voice messaging system that is user specific. In one embodiment, the ICS Window will display a user login prompt where the user enters the user name and PIN code. Subsequently, the system displays the user's configuration date, such as PIN code, attendant extension, greeting type, and other applicable information.

The hidden browser enables an HTTP link and communications with the IM, for example, which then brokers communications (via HTTP) with the MCS via the MCS Web Server (FIG. 6-X) for example. Therefore, while typical messaging servers and LANs use security policies that restrict the use of "special" code in form data, use of the hidden browser embedded in a form structure that is native to the host system overcomes this restriction because the browser is not detected or considered as special code. Use of the hidden browser thus supports communication with the corresponding browser control in the MCS and/or the IM, thereby allowing the integration of voice mail messaging provided by the MCS with the email messaging system of the enterprise network A "voice mail message" in the ICS is generally any message created using a client device generating an audio stream. A "voice mail message" is also any VMT message, such as a message created using the "Reply by Voice Message" and "Forward by Voice Message" buttons of the FBUI. An "email" is any message created using buttons of a host mail message system that function to generate a reply message or to forward a message in response to receipt of a message, even if replying or forwarding a voice mail message. The ICS of an embodiment presents a voice mail message to a user in an email message system using the FBUI as the presentation form.

As described above, FBUI 1200-X allows a user to take action on a voice mail message via buttons 1206A-X-1206E-X of FBUI 1200-X. Therefore, placing the cursor of contents area 1204-X on a particular message and choosing an action on the selected message with a button 1206A-X-1206E-X invokes the action on the message via components of the MCS and/or the enterprise network environment.

As one example of an action on a voice mail message, and with further reference to FIG. 11-X, the user may select a "Play on Phone" action using button 1206A-X. In response the user's client device couples to a component of the ICS (e.g., IM) using the hidden browser of the FBUI. The client device receives a pop-up message from the ICS via the browser link and the ICS Window, where the pop-up message allows the user to choose or enter a telephone number to which he/she would like the selected voice mail message routed. The pop-up message also includes a "connect" button by which the user initiates routing of the selected voice mail message to the selected telephone. In response to selection of the "connect" button, the IM couples with an MCS, and the MCS causes the PBX to initiate a call to the telephone number selected by the user via the pop-up window. Upon connection of the call from the PBX to the selected telephone, the MCS pushes the contents of the voice mail message to the selected telephone.

Another example of an action on a voice mail message includes selection of a "Play on Computer" action by the user via button 1206B-X. In response the user's client device couples to a component of the ICS (e.g., IM) using the hidden browser of the FBUI. In response to selection of the "Play on Computer" button, the IM couples with an MCS, and the MCS pushes a form to the user's computer that resembles a typical email. The form includes an attachment that is an audio file (e.g., WAVE, MP3, other audio formats, etc.). When the user selects the attachment the client device may launch the default audio player of the client device.

Alternatively, selection of the attachment in a "Play on Computer" action may result in the browser form controlling launch of a pre-specified audio player instead of the default audio player. This is similar to the hidden browser described above with reference to presentation of the FBUI.

The user may also select a "Call Sender" action on a voice mail message using button 1206C-X. In response the user's client device couples to a component of the ICS (e.g., IM) using the hidden browser of the FBUI. In response to selection of the "Call Sender" button, the IM couples with an MCS, and the MCS retrieves the selected message from the Cache or the MSERV. Using the caller information from the retrieved message, the MCS causes the PBX to connect the call to the user's local telephone. Upon connection of the call from the PBX to the user's telephone, the MCS causes the PBX to initiate a call to the sender's telephone number as determined from the caller information associated with the voice message.

Additionally, the user may select a "Reply by Voice Message" action on a voice mail message using button 1206D-X. In response the user's client device couples to a component of the ICS (e.g., IM) using the hidden browser of the FBUI. In response to selection of the "Reply by Voice Message" button, the IM couples with an MCS, and the MCS retrieves the selected message from the Cache or the MSERV. The MCS causes a reply message to be generated corresponding to the received message, and prompts the user to record an audio message for the reply. The user records the audio for the reply via a microphone coupled to his/her client device. Alternatively, the user may record the audio for the reply via his/her local telephone. Upon completing the audio reply recording, the MCS causes the reply message to be transmitted to the designated addressees via the MSERV. A user is not required to listen to a message to invoke the "Reply by Voice Message" action.

The user may also select a "Forward by Voice Message" action on a voice mail message using button 1206E-X. In response the user's client device couples to a component of the ICS (e.g., IM) using the hidden browser of the FBUI. The client device receives a pop-up message from the ICS via the browser link, where the pop-up message allows the user to choose or enter a telephone number to which he/she would like the selected voice mail message routed. The pop-up message also includes a "connect" button by which the user initiates routing of the selected voice mail message to the selected telephone. In response to selection of the "connect" button, the IM couples with an MCS, and the MCS causes the PBX to initiate a call to the telephone number selected by the user via the pop-up window. Upon connection of the call from the PBX to the called telephone selected by the user, the MCS pushes the contents of the voice mail message to the called telephone and the user. During the session, and in addition to the contents of the voice mail message, the MCS may provide a verbal prompt to the user requesting information of the party to whom the message is to be forwarded, and/or a prompt to the user to record an audio message to be forwarded along with the forwarded message. A user is not required to listen to a message to invoke the "Forward by Voice Message" action.

FIG. 13-X is a block diagram of a system 13-X that includes multiple Sites (defined herein) and multiple components, under an alternative embodiment. System 13-X includes multiple Sites, some of which may have multiple MCSs, IMs, private communication networks and MSERVs. As shown, system 13-X includes MSERV 1390-X and MSERV 1391-X communicating via a network 1392-X, which may comprise any of a public network, such as a PSTN, or private communications network or other network. The MSERVs are coupled to one or more IMs. For example, as shown here, MSERV 1390-X is coupled to IMs 1385-X (IM1-X and IM2-X), and MSERV 1391-X is coupled to IMs 1386-X (IM3-X and IM4-X). The IMs are coupled to one or more MCSs. For example, as shown here IM1 is coupled to MCS1-X, MCS2-X, and MCS3-X; IM2-X is coupled to MCS2-X, MCS3-X, MCS4-X and MCS5-X; IM3-X is coupled to MCS6-X and MCS7-X; and IM 4-X is coupled to MCS8-X. The MCSs are coupled to private communications networks. As shown here, MCS1-X, MCS2-X, MCS3-X, MCS4-X and MCS 5-X are coupled to private communications network 1-X 1360A-X; MCS6-X, and MCS7-X are coupled to private communications network 2-X 1360B-X; and MCS8-X is coupled to private communications network 2-X 1360B-X and private communications network 3-X 1360C-X.

Thus, FIG. 13-X shows a system 13-X that is scalable in a number of different dimensions, according to various embodiments of the invention. Two MSERVs are shown coupled by a network. This configuration allows for sharing of voicemail messages, user lists, global address lists, distribution lists and public folders between the various MSERVs that connected by a network and which may be placed at the same or different locations. Additionally, use of multiple MSERVs allows for scaling of the overall system through the increased capacity provided by the multiple MSERVs.

Multiple MCSs are shown. Increased number of MCSs can help to increase overall system capacity and/or redundancy by providing increased number of ports, storage, and processing capacity. According to an embodiment of the invention, information on the MCSs is derived from the MSERVs and automatically cached on the MCSs. This allows for easy deployment of new MCSs by which the data and configuration settings for the new MCSs are acquired from the MSERV(s) and/or caches of other MCSs. Additionally, an MCS may be coupled to more than one private communications network. In some cases an MCS may operate with multiple private communications networks simultaneously. Also, an MCS that is coupled to multiple private communications networks may continue operation with a non-failing private communications network in the event that one of the private communications networks to which the MCS is coupled fails. In one embodiment, the MCS that is coupled to multiple private communications networks operates with at least one of the private communications networks, but begins to operate with another, non-failing private communications network in the event that a private communications network to which the MCS is coupled fails.

Multiple IMs are shown in FIG. 13-X, which help to support the capacity of additional MCSs. The multiple IMs also may provide fail over support for each other in the event that one of the IMs fails.

In FIG. 13-X, the equipment and users associated with a particular private communications network referred to as members of a "Site." Accordingly, a user may have a Site identification. The Site identification may be used to filter user information associated with a particular Site from the a broader set of user information stored on the MSERV servicing multiple Sites. Additionally, Sites may be combined into auto attendant groups. The auto attendant groups are Sites that share a common dial plan. For example, members of an auto attendant group may able to place calls using extension numbers instead of full numbers.

According to an embodiment of the invention, various subsets of users may be defined from among the users in an MSERV or set of networked MSERVs. Such subsets of users may be defined by a Site identification. In this way, various subsets of users may be associated with different respective private communications networks, such that the users' access to respective Sites within a network of MSERVs depends on the users' membership in the various defined subsets of users. For example, members of a subgroup of users associated with a particular Site may be able to use functions such as message waiting indication and control of messaging actions at their associated Site but not at other Sites.

An embodiment of the invention is directed to a method for providing diagnostics. Identification of diagnostic compiled code and diagnostic source code is received. The diagnostic source code is compiled on a target system on which the diagnostics are to be performed. Information is gathered about diagnostic methods included within the diagnostic compiled code and about diagnostic methods included within the diagnostic compiled code resulting from the compiling. Based on the gathered information, the diagnostic methods are run on the target system. Results of the diagnostic methods are gathered.

According to an embodiment of the invention, reflection is used to gather information about the diagnostic methods. The compiled code may comprise NET framework intermediate language (IL) assembly code. The target system may comprise a voicemail system. Additionally, the target system may comprise a messaging and collaboration server, such as Microsoft Exchange. The diagnostic methods may include diagnostic on a greeting in a voicemail system.

Another embodiment of the invention is directed to a method for providing diagnostics in which the diagnostics may include a parameter or parameters. Identification of diagnostic code is received, and information is gathered about diagnostic methods included with the diagnostic code. In software running on the target system on which the diagnostic code is to be run, parameters used by the code are identified. Values for the parameters are received. The diagnostic code is run on the target system using the parameters, and the results of the diagnostic code are gathered.

Another embodiment of the invention is directed to a method for providing diagnostics for a target system. The diagnostic framework computer code is provided on the target system. Source code of diagnostic modules is provided on the target system, and source code of the diagnostic modules is provided to the framework computer code. The source code of the diagnostic modules is compiled and the diagnostic modules are run on the target system.

Another embodiment of the invention is directed to a diagnostic tool. The tool includes logic that receives identification of diagnostic compiled code and diagnostic source code. The tool also includes logic that causes the diagnostic source code to be compiled. Logic in the tool gathers information about diagnostic methods included within the diagnostic compiled code and about methods included within the diagnostic code resulting from the compiling. Also included in the diagnostic tool is logic that, based on gathering the information, runs the diagnostic methods. Logic in the tool gathers the results of the diagnostic methods. According to an embodiment of the invention, the logic in the diagnostic tool comprises compiled assembly.

The diagnostic methods may include one or more of: a diagnostic of a greeting in a voicemail system, include gathering version information about the installed target system assemblies, verifying that target system service account information is present in a registry, checking ability to impersonate an account, including testing a password for the account, checking correctness of path information in the registry for software of the target system, checking correctness of installation of web software on the target system, checking for presence of source configurable rules for user extensions on the target system, verifying permissions of the target system service account for the target system web service software to run, verifying permissions of the target system service account for the target system web application software to run, verifying permissions of the target system service account for the target system email system extension software to run, verifying permissions of the target system service account to access identity key of service account in a registry, and verifying a pin code.

Another embodiment of the invention is directed to an interface module (IM). The IM includes: logic to communicate with a messaging communication server (MCS) that processes voice messages; logic to communicate with a messaging and collaboration server (MSERV) that stores voice messages and user information; and a diagnostic tool. The diagnostic tool includes logic that receives identification of diagnostic compiled code and diagnostic source code, logic that causes the diagnostic source code to be compiled, logic that gathers information about diagnostic methods included within the diagnostic compiled code and about diagnostic methods included within the diagnostic compiled code resulting from the compiling, logic that, based on the gathered information, runs the diagnostic methods, and logic that gathers results of the diagnostic methods. The logic may comprise software, such as software stored on a computer readable medium.

Another embodiment of the invention is directed to a communication system. The communication system includes: a messaging communication server (MCS) that processes voice messages, a messaging and collaboration server (MSERV) that stores voice messages and user information, and a diagnostic tool that diagnoses aspects of the communication system, the diagnostic tool. The diagnostic tool includes logic that receives identification of diagnostic compiled code and diagnostic source code, logic that causes the diagnostic source code to be compiled, logic that gathers information about diagnostic methods included within the diagnostic compiled code and about diagnostic methods included within the diagnostic compiled code resulting from the compiling, logic that, based on the gathered information, runs the diagnostic methods, and logic that gathers results of the diagnostic methods. The diagnostic tool may be included within the MSERV.

The components of the ICS described above include any collection of computing components and devices operating together. The components of the ICS can also be components or subsystems within a larger computer system or network. The ICS components can also be coupled among any number of components (not shown), for example other buses, controllers, memory devices, and data input/output (I/O) devices, in any number of combinations. Further, components of the ICS can be distributed among any number/combination of other processor-based components.

Aspects of the ICS described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the ICS include: microcontrollers with memory (such as electronically erasable programmable read only memory (EEPROM)), embedded microprocessors, firmware, software, etc. Furthermore, aspects of the ICS may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the ICS may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the ICS is not intended to be exhaustive or to limit the ICS to the precise form disclosed. While specific embodiments of, and examples for, the ICS are described herein for illustrative purposes, various equivalent modifications are possible within the scope of the ICS, as those skilled in the relevant art will recognize. The teachings of the ICS provided herein can be applied to other processing systems and methods, not only for the systems and methods described above.

The elements and acts of the various embodiments described above can be combined to provide further embodiments. These and other changes can be made to the ICS in light of the above detailed description.

In general, in the following claims, the terms used should not be construed to limit the ICS to the specific embodiments disclosed in the specification and the claims, but should be construed to include all processing systems that operate under the claims. Accordingly, the ICS is not limited by the disclosure, but instead the scope of the ICS is to be determined entirely by the claims.

While certain aspects of the ICS are presented below in certain claim forms, the inventors contemplate the various aspects of the ICS in any number of claim forms. For example, while only one aspect of the ICS is recited as embodied in machine-readable medium, other aspects may likewise be embodied in machine-readable medium. Accordingly, the inventors reserve the right to add additional claims after filing the application to pursue such additional claim forms for other aspects of the ICS.

What is claimed is:

1. A method for providing diagnostics, the method comprising:

receiving, by a CPU, identification of diagnostic compiled code;

receiving, by the CPU, identification of diagnostic source code;

compiling, by the CPU, the diagnostic source code on a target system on which the diagnostics are to be performed;

gathering, by the CPU, first information about first diagnostic methods included within the diagnostic compiled code;

gathering, by the CPU, second information about second diagnostic methods included within the compiled diagnostic source code resulting from the compiling;

based on the first and second gathered information, running, by the CPU, the first and second diagnostic methods on the target system; and gathering, by the CPU, results of the first and second diagnostic methods.

2. The method of claim 1, including using reflection to gather information about the diagnostic methods.

3. The method of claim 1, wherein the compiled code comprises .NET framework assembly code.

4. The method of claim 1, wherein the target system comprises a voicemail system.

5. The method of claim 1, wherein the target system comprises a messaging and collaboration server.

6. The method of claim 1, wherein the diagnostic methods include a diagnostic of a greeting in a voicemail system.

7. The method of claim 1, wherein the diagnostic methods include gathering version information about the installed target system assemblies.

8. The method of claim 1, wherein the diagnostic methods include verifying that target system service account information is present in a registry.

9. The method of claim 1, wherein the diagnostic methods include checking ability to impersonate an account, including testing a password for the account.

10. The method of claim 1, wherein the diagnostic methods include checking correctness of path information in the registry for software of the target system.

11. The method of claim 1, wherein the diagnostic methods include checking correctness of installation of web software on the target system.

12. The method of claim 1, wherein the diagnostic methods include checking for presence of source configurable rules for user extensions on the target system.

13. The method of claim 1, wherein the diagnostic methods include verifying permissions of the target system service account for the target system web service software to run.

14. The method of claim 1, wherein the diagnostic methods include verifying permissions of the target system service account for the target system web application software to run.

15. The method of claim 1, wherein the diagnostic methods include verifying permissions of the target system service account for the target system email system extension software to run.

16. The method of claim 1, wherein the diagnostic methods include verifying permissions of the target system service account to access identity key of service account in a registry.

17. The method of claim 1, wherein the diagnostic methods include verifying a pin code.

18. A method for providing diagnostics, the method comprising:

a processor receiving identification of diagnostic code;

the processor gathering information about diagnostic methods included within the diagnostic code;

in software running on a target system on which the diagnostic code is to be run, the processor identifying, with the cooperation of a CPU, parameters used by code;

the processor receiving values for parameters;

the processor running diagnostic code on the target system using the parameters; and the processor gathering results of the diagnostic code.

19. The method of claim 18, including using reflection to gather information about the diagnostic methods.

20. The method of claim 18, wherein the compiled code comprises .NET framework assembly code.

21. The method of claim 18, wherein the target system comprises a voicemail system.

22. The method of claim 18, wherein the target system comprises a messaging and collaboration server.

23. A method for providing diagnostics for a target system, the method comprising:

a processor providing diagnostic framework computer code on the target system;

the processor providing source code of diagnostic modules on the target system;

the processor providing the source code of the diagnostic modules to the framework computer code;

the processor compiling, by a CPU, the source code of the diagnostic modules; and the processor running the compiled diagnostic modules on the target system.

24. A diagnostic tool comprising:

logic, executed by a processor, that receives identification of diagnostic compiled code;

logic, executed by a processor, that receives identification of diagnostic source code;

logic, executed by the processor, cooperating with a CPU, that causes the diagnostic source code to be compiled;

logic, executed by the processor, that gathers first information about first diagnostic methods included within the diagnostic compiled code;

logic, executed by the processor, that gathers second information about second diagnostic methods included within the compiled diagnostic source code resulting from the compiling;

logic, executed by the processor, that, based on the first and second gathered information, runs the first and second diagnostic methods; and logic, executed by the processor, that gathers results of the first and second diagnostic methods.

25. The diagnostic tool of claim 24, wherein the logic comprises compiled assembly.

26. The diagnostic tool of claim 24, wherein the logic comprises software stored on a computer readable medium.

27. An interface module (IM) comprising:

logic, executed by a processor, to communicate with a messaging communication server (MCS) that processes voice messages;

logic, executed by the processor, to communicate with a messaging and collaboration server (MSERV) that stores voice messages and user information; and a diagnostic tool comprising:

logic, executed by the processor, that receives identification of diagnostic compiled code;

logic, executed by the processor, that receives identification of diagnostic source code;

logic, executed by the processor, cooperating with a CPU, that causes the diagnostic source code to be compiled;

logic, executed by the processor, that gathers first information about diagnostic methods included within the diagnostic compiled code;

logic, executed by the processor, that gathers second information about second diagnostic methods included within the compiled diagnostic source code resulting from the compiling;

logic, executed by the processor, that, based on the first and second gathered information, runs the first and second diagnostic methods; and logic, executed by the processor, that gathers results of the first and second diagnostic methods.

28. The IM of claim 27, wherein the logic comprises software.

29. The IM of claim 27, wherein the logic comprises software stored on a computer readable medium.

30. A communication system comprising:
- a messaging communication server (MCS) that processes voice messages;
- a messaging and collaboration server (MSERV) that stores voice messages and user information; and
- a diagnostic tool that diagnoses aspects of the communication system, the diagnostic tool comprising:
  - logic, executed by a processor, that receives identification of diagnostic compiled code;
  - logic, executed by the processor, that receives identification of diagnostic source code;
  - logic, executed by the processor, that causes the diagnostic source code to be compiled;
  - logic, executed by the processor, that gathers first information about diagnostic methods included within the diagnostic compiled code;
  - logic, executed by the processor, that gathers second information about second diagnostic methods included within the compiled diagnostic source code resulting from the compiling;
  - logic, executed by the processor, that, based on the first and second gathered information, runs the first and second diagnostic methods; and
  - logic, executed by the processor, that gathers results of the first and second diagnostic methods.

31. The system of claim 30, wherein the diagnostic tool is included within the MSERV.

* * * * *